(12) United States Patent
Chen

(10) Patent No.: US 10,906,001 B2
(45) Date of Patent: Feb. 2, 2021

(54) METHODS AND SYSTEMS FOR TREATING HIGH TEMPERATURE PRODUCED WATER

(71) Applicant: Chevron U.S.A. Inc., San Ramon, CA (US)

(72) Inventor: Cheng Chen, Richmond, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 15/730,797

(22) Filed: Oct. 12, 2017

(65) Prior Publication Data

US 2018/0028978 A1 Feb. 1, 2018

Related U.S. Application Data

(63) Continuation-in-part of application No. 14/844,221, filed on Sep. 3, 2015, now Pat. No. 10,287,201, which
(Continued)

(51) Int. Cl.
*B01D 61/58* (2006.01)
*B01D 61/02* (2006.01)
(Continued)

(52) U.S. Cl.
CPC ............ *B01D 61/58* (2013.01); *B01D 61/025* (2013.01); *B01D 61/145* (2013.01); *C02F 1/441* (2013.01);
(Continued)

(58) Field of Classification Search
CPC ........ B01D 15/00; B01D 15/08; B01D 37/00; B01D 37/04; B01D 61/00; B01D 61/02;
(Continued)

(56) References Cited

U.S. PATENT DOCUMENTS 2,336,659 A 12/1943 Welp
4,574,049 A 3/1986 Pittner
(Continued)

FOREIGN PATENT DOCUMENTS

WO 2006128730 A1 12/2006

OTHER PUBLICATIONS

Franks et al., IDA World Congress—Atlantis, The Palm—Dubai, UAE, "RO Membrane Performance when Reclaiming Produced Water from the Oil Extraction Process", Nov. 7-12, 2009 (Year: 2009).*

(Continued)

*Primary Examiner* — Joseph W Drodge

(57) ABSTRACT

Produced water from a crude oil or natural gas production process is purified using a membrane purification system for petroleum production, agricultural, commercial and domestic uses. The produced water is pretreated to remove, at least, particulates and oil from the produced water. The minimally pretreated water is then purified in a membrane purification system, that is operated at conditions such that membrane scaling is reduced or prevented. In particular, the membrane purification system is operated to maintain the turbidity of clarified water feed to the system or intermediate aqueous streams that are cascading through the membrane purification system. Ensuring that the turbidity of the reject streams generated in the membrane system are useful in achieving long membrane operating life.

19 Claims, 6 Drawing Sheets

Related U.S. Application Data is a continuation-in-part of application No. 13/836,317, filed on Mar. 15, 2013, now abandoned.

(60) Provisional application No. 62/198,291, filed on Jul. 29, 2015, provisional application No. 61/754,399, filed on Jan. 18, 2013.

(51) Int. Cl.

| | | |
|---|---|---|
| B01D 61/14 | (2006.01) | |
| E21B 41/00 | (2006.01) | |
| C02F 1/44 | (2006.01) | |
| C02F 9/00 | (2006.01) | |
| C02F 5/06 | (2006.01) | |
| E21B 43/40 | (2006.01) | |
| E21B 43/20 | (2006.01) | |
| C02F 1/42 | (2006.01) | |
| C02F 1/66 | (2006.01) | |
| E21B 43/24 | (2006.01) | |
| E21B 43/34 | (2006.01) | |
| C02F 1/20 | (2006.01) | |
| C02F 5/02 | (2006.01) | |
| C02F 5/08 | (2006.01) | |
| C02F 5/00 | (2006.01) | |
| C02F 1/24 | (2006.01) | |
| C02F 103/10 | (2006.01) | |
| C02F 101/10 | (2006.01) | |
| C02F 101/16 | (2006.01) | |
| C02F 1/00 | (2006.01) | |
| C02F 101/32 | (2006.01) | |
| C02F 1/52 | (2006.01) | |
| B01D 61/04 | (2006.01) | |

(52) U.S. Cl.
CPC .............. *C02F 5/06* (2013.01); *C02F 9/00* (2013.01); *E21B 41/00* (2013.01); *E21B 43/40* (2013.01); *B01D 61/022* (2013.01); *B01D 61/04* (2013.01); *B01D 61/142* (2013.01); *B01D 2311/06* (2013.01); *B01D 2311/18* (2013.01); *B01D 2311/25* (2013.01); *B01D 2311/268* (2013.01); *B01D 2311/2623* (2013.01); *B01D 2317/025* (2013.01); *C02F 1/20* (2013.01); *C02F 1/24* (2013.01); *C02F 1/42* (2013.01); *C02F 1/442* (2013.01); *C02F 1/444* (2013.01); *C02F 1/52* (2013.01); *C02F 1/5245* (2013.01); *C02F 1/66* (2013.01); *C02F 5/00* (2013.01); *C02F 5/025* (2013.01); *C02F 5/083* (2013.01); *C02F 2001/007* (2013.01); *C02F 2001/425* (2013.01); *C02F 2101/10* (2013.01); *C02F 2101/108* (2013.01); *C02F 2101/16* (2013.01); *C02F 2101/32* (2013.01); *C02F 2103/10* (2013.01); *C02F 2209/06* (2013.01); *C02F 2209/10* (2013.01); *C02F 2209/11* (2013.01); *C02F 2303/22* (2013.01); *E21B 43/20* (2013.01); *E21B 43/24* (2013.01); *E21B 43/34* (2013.01)

(58) Field of Classification Search
CPC .... B01D 61/025; B01D 61/027; B01D 61/12; B01D 61/58; B01D 63/00; B01D 65/00; B01D 2221/04; B01D 61/022; B01D 61/04; B01D 61/14; B01D 61/142; B01D 61/145; B01D 61/20; B01D 2311/04; B01D 2311/25; B01D 2311/2623; B01D 2311/268; C02F 1/00; C02F 1/001; C02F 1/004; C02F 1/42; C02F 1/44; C02F 1/441; C02F 1/66; C02F 5/00; C02F 5/02; C02F 9/00; C02F 2101/10; C02F 2101/108; C02F 2101/16; C02F 2201/007; C02F 2209/06; C02F 2209/14; C02F 2303/00; C02F 2303/22; C02F 1/20; C02F 1/442; C02F 1/445; C02F 1/58; C02F 1/60; C02F 5/06; C02F 2103/365; C02F 2209/10; E21B 41/00; E21B 43/34; E21B 43/40

See application file for complete search history.

(56) References Cited

U.S. PATENT DOCUMENTS

| | | |
|---|---|---|
| 5,250,185 A | 10/1993 | Tao et al. |
| 5,683,587 A | 11/1997 | Ferrara et al. |
| 5,695,643 A | 12/1997 | Brandt et al. |
| 5,879,562 A | 3/1999 | Garbutt |
| 5,925,255 A | 7/1999 | Mukhopadhyay |
| 6,054,050 A | 4/2000 | Dyke |
| 6,113,797 A | 9/2000 | Al-Samadi |
| 6,461,514 B1 | 10/2002 | Al-Samadi |
| 6,537,456 B2 | 3/2003 | Mukhopadhyay |
| 7,520,993 B1 | 4/2009 | Laraway et al. |
| 8,915,301 B1* | 12/2014 | Bader .............. C02F 9/00 166/371 |
| 2002/0153319 A1 | 10/2002 | Mukhopadhyay |
| 2004/0079700 A1 | 4/2004 | Wood et al. |
| 2005/0279500 A1 | 12/2005 | Heins |
| 2007/0090039 A1* | 4/2007 | Young ............. B01D 65/02 210/321.6 |
| 2008/0135478 A1* | 6/2008 | Zuback ............ B01D 61/022 210/638 |
| 2008/0173583 A1* | 7/2008 | Boodoo ............. C02F 1/42 210/652 |
| 2008/0290033 A1* | 11/2008 | Kimball ........... B01D 61/022 210/652 |
| 2009/0173692 A1* | 7/2009 | Laraway ........... B01D 61/58 210/638 |
| 2011/0168629 A1 | 7/2011 | Minnich et al. |
| 2012/0255904 A1* | 10/2012 | Nagghappan ......... C02F 9/00 210/638 |
| 2013/0075335 A1* | 3/2013 | Prakash ............ C02F 1/463 210/640 |
| 2016/0009582 A1 | 1/2016 | Heimel et al. |

OTHER PUBLICATIONS

Reclamation,US Department of the Interior Bureau of Reclamation, Desalination and Water Purification Research and Development Program Report No. 127, "Boron Rejection by Reverse Osmosis Membranes: National Reconnaissance and Mechanism Study", Jul. 2009, pp. i-124 (Year: 2009).*
Arthur et al., All Consulting, LLC , "Technical Summary of Oil & Gas Produced Water Treatment Technologies" (Year: 2005).*
Snow et al., Desalination 105 (1996) 57-61 (Year: 1996).*
Ba, Chaoyi; "Design of Advanced Reverse Osmosis and Nanofiltration Membranes for Water Purification"; Dissertation, (2010), Title page, pp. ii-xv, pp. 1-38.
Ba, Chaoyi; "Design of Advanced Reverse Osmosis and Nanofiltration Membranes for Water Purification"; Dissertation, (2010), pp. 39-91.
Ba, Chaoyi; "Design of Advanced Reverse Osmosis and Nanofiltration Membranes for Water Purification"; Dissertation, (2010), pp. 92-143.
Tsang, Patrick B., et al.; "Economic Evaluation of Treating Oilfield Produced Water for Potable Use"; SPE 86948, Mar. 2004, pp. 1-16.
International Search Report, dated May 9, 2014, during the prosecution of International Application No. PCT/US2014/010840.
Written Opinion of the International Searching Authority, dated May 9, 2014, during the prosecution of International Application No. PCT/US2014/010840.

(56) References Cited

OTHER PUBLICATIONS

Ray, James P., et al.; "Produced Water"; (1992), Technical/Environmental Issues and Solutions, Environmental Science Research, vol. 46, 15 pages.

* cited by examiner

METHODS AND SYSTEMS FOR TREATING HIGH TEMPERATURE PRODUCED WATER

CROSS-REFERENCE TO RELATED APPLICATION

The present application is a continuation-in-part application of and claims the benefit under 35 USC §120 of U.S. application Ser. No. 14/844,221, with a filing date of Sep. 3, 2015, which in turn is a continuation-in-part application of and claims the benefit under 35 USC §120 of U.S. application Ser. No. 13/836,317, with a filing date of Mar. 15, 2013. This application also claims benefit under 35 USC 119 of U.S. Provisional Patent Application No. 62/198,291 with a filing date of Jul. 29, 2015. This application claims priority to and benefits from the foregoing, the disclosures of which are incorporated herein by reference.

TECHNICAL FIELD

The present disclosure generally relates to system methods for purifying and clarifying water. In one embodiment, systems and methods are directed to purifying water with high total hardness levels produced from oil and gas operations to result in cleaner boiler or drinking quality water.

BACKGROUND

Crude oil and natural gas production often involves generating produced water along with the petroleum products. Reusing this water, either as part of the petroleum production, or for hot water and steam generation, for agriculture and irrigation uses, or for municipal water supply is important to maintain an efficient and responsible petroleum production process. Membrane purification systems are known for purifying water by rejecting contaminants in the produced water down to very low levels, including those that meet or exceed domestic and industrial water requirements.

However, the conventional methods for using RO (reverse osmosis) membrane systems for water purification require careful and extensive pretreatment of the produced water prior to purification in the membrane purification system. Produced water frequently contains oil, solid particulates and high amounts of hardness, all of which easily cause scaling issues in a membrane purification system. Membrane scaling quickly degrades membrane separation performance; it is one of the continuing factors that prevent further commercial employment of membrane purification systems for water purification.

In conventional methods, the produced water undergoes an extensive pretreatment process to remove contaminants in the produced water that would otherwise cause membrane scaling. At a minimum, conventional pretreatment methods include reducing or removing hardness from the produced water prior to RO membrane purification. Water softening methods are known; these are often employed to remove the dissolved solids in the produced water that easily form scale on RO membranes. Examples include calcium, magnesium and barium compounds of oxide, carbonate and sulfate. In additional, convention purification processes include adjusting the pH of produced water prior to the RO membrane purification, to further reduce the chances of scaling occurring. Levels of pH of 10 and higher are known and taught. While adding sufficient alkali to the produced water to achieve this high pH value (at a significant cost and at additional operating complexity), difficulties arise with separating some of the contaminants from the produced water. For example, boron and ammonia are preferentially removed from produced water at different pH values. Operating the membrane purification system at a high pH may not even be effective for achieving a desired level of water purification.

There is a need for improved methods for purifying produced water.

SUMMARY

The present invention is directed to producing purified water from produced water that is recovered from a well extending into a subterranean formation, in a method that includes the use of membrane separations systems. Conventional treatment typically involves a number of separate pretreatment process steps for particulate and oil removal, hardness reduction and significant pH adjustment, in some cases to a pH of greater than 10, to conventionally prepare produced water for membrane purification. At least in part, the present invention relates to methods for operating a simplified membrane purification system relative to conventional methods for water purification.

In one aspect, the method comprises recovering produced water from a well extending into a subterranean formation; passing a feed stream of the produced water having a temperature of at least 45° C. through an ultrafiltration membrane module having a plurality of membrane elements to produce a first permeate stream containing up to 5000 ppm oil and gas, up to 20,000 ppm total dissolved solids and more than 0.5 mg/L boron and a first retentate stream. The first permeate stream is passed to an ion exchange softener module comprising a plurality of ion exchange resin pellets to produce a soft water stream having a hardness less than 5 ppm as calcium carbonate. The pH of the soft water stream is adjusted to produce a reverse osmosis feed stream having a pH of 9-12. The reverse osmosis feed stream is passed to a high temperature reverse osmosis membrane module having a plurality of membrane elements to form a purified water stream containing less than 500 ppm total dissolved solids.

In another aspect, the method comprises recovering produced water from a well extending into a subterranean formation; passing a feed stream of the produced water having a temperature of at least 45° C. and a hardness of from 1 to 10 ppm through an ultrafiltration membrane module having a plurality of membrane elements to produce a first permeate stream containing up to 5000 ppm oil and gas, up to 20,000 ppm total dissolved solids and more than 0.5 mg/L boron and a first retentate stream. The pH of the first permeate stream is adjusted to produce a reverse osmosis feed stream having a pH of 9-12. The reverse osmosis feed stream is passed to two high temperature reverse osmosis membrane modules in series wherein each high temperature reverse osmosis membrane module comprises a plurality of membrane elements to form a purified water stream containing less than 500 ppm total dissolved solids.

BRIEF DESCRIPTION OF THE DRAWINGS

FIG. 1 further illustrates retentate recycle to control RO membrane scaling.

FIG. 2 illustrates retentate recycle; FIG. 3 illustrates retentate treating; and FIG. 4 illustrates permeate pH-adjustment.

DETAILED DESCRIPTION

Figure 1:
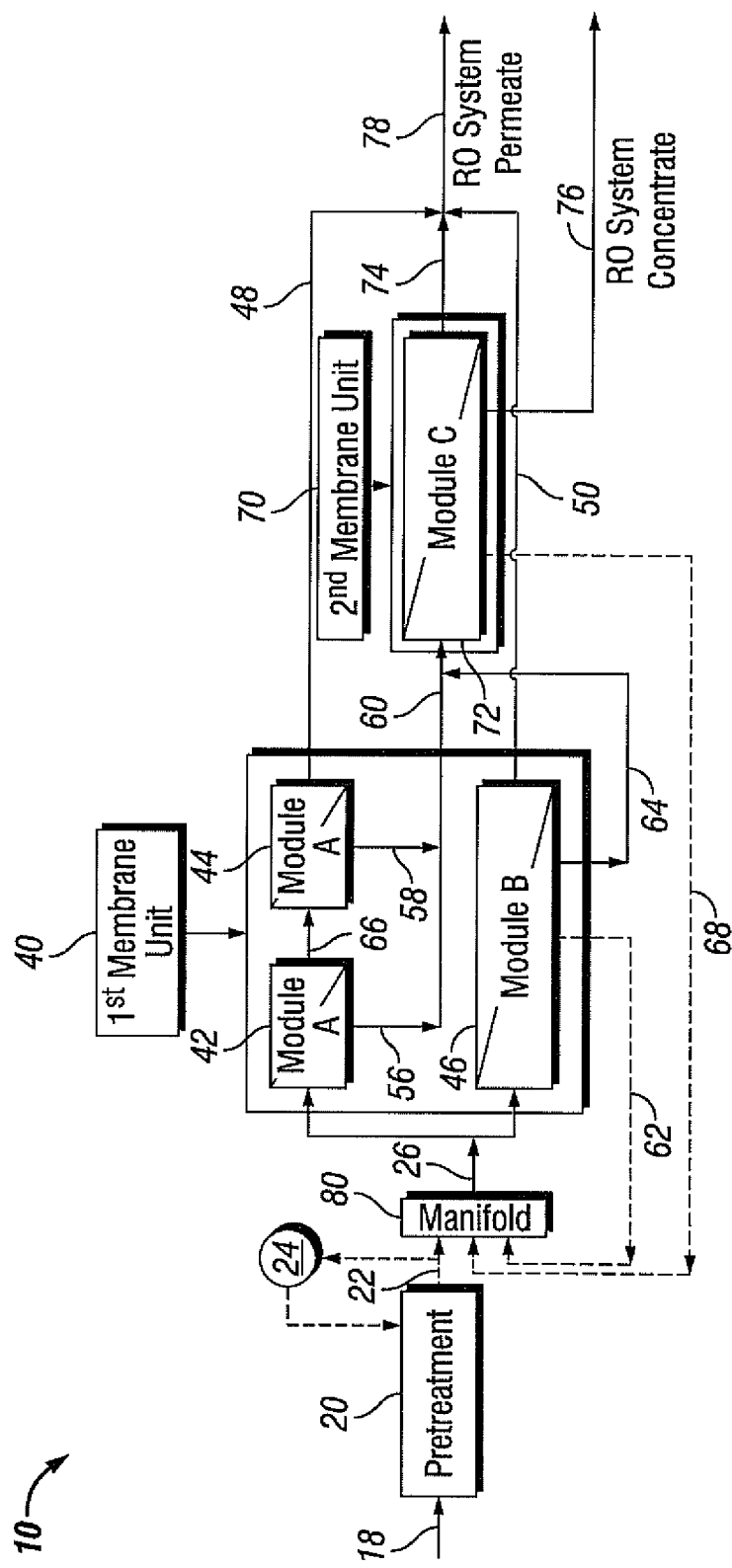
FIG. 1 illustrates a membrane purification system having a plurality of membrane units, each unit having one or more membrane modules in parallel or serial flow.

The following definitions are provided to aid in understanding the scope of the invention. These definitions are operative in this application unless otherwise indicated.

"Total dissolved solids" or TDS refers to inorganic salts (e.g., calcium, magnesium, potassium, sodium, bicarbonates, chlorides, and sulfates) and some small amounts of organic matter that are dissolved in water.

"Hardness" refers to the concentration of multivalent cations, represented in parts per million (ppm). Typically, the multivalent cations are calcium, magnesium, strontium and barium. The total hardness is a summation of calcium, magnesium, strontium, and barium ions in terms of calcium carbonate equivalent values.

"High hardness" refers to water with a hardness of over any of 1000 ppm, over 2000 ppm, over 3000 ppm, over 4000 ppm, over 5000 ppm, over 6000 ppm, over 7000 ppm, over 8000 ppm, over 9000 ppm, over 10,000 ppm, over 11,000 ppm, or over 12,000 ppm calcium carbonate equivalent.

"Water softening," as used herein, refers to removing hardness from the water. "Partial water softening," as used herein, refers to removing less than 95% of the total hardness from the water.

As used herein "boiler quality water" refers to water with TDS less than 20 and hardness levels less than 0.5 ppm, or equal to 0 ppm. "Once-through steam generator quality water" refers to water with hardness levels less than 0.5 ppm.

"Produced water" refers to water that is produced along with oil or gas in an oil or gas recovery process.

"Hydraulic retention time" (HRT) refers to a measure of the average length of time that a liquid remains in a holding vessel (e.g. a clarification module). Hydraulic retention time is the volume of the clarification module divided by the influent flowrate.

"Membrane filtration" refers to a separation process with the use of at least a membrane to act as a filter that would let water flow through, while it catches suspended solids and other substances. In the membrane filtration modules and driven by any of pressure, vacuum or electrical force (electro-dialysis or ED), part of the liquid passes through the membrane. This fraction is called "permeate" or "filtrate", while the fraction that does not pass through the membrane is called "retentate" or "concentrate".

"Microfiltration" (MF) refers to a low pressure (e.g., 5 to 45 psi or 0.34 to 3 bar) membrane filtration process for the retention of suspended material. Microfiltration removes particles of 50 nm or larger. Smaller particles (salts, sugars and proteins, for example) pass through the membrane.

"Ultrafiltration" (UF) refers to a medium pressure (7 to 150 psi or 0.48 to 10 bar) membrane filtration process, for the retention of colloids, biological matters, etc. Ultrafiltration removes particles of roughly 3 nm or larger.

"Nanofiltration" (NF) refers to a membrane filtration process with operating pressure of 120 to 600 psi (or 8 to 41 bar), that would allow water and monovalent ions as well as low molecular weight substances (e.g., less than 250 Daltons) to pass through the membranes. Nanofiltration removes particles of 1 nm or larger. Divalent or multivalent ions and salts are retained.

"Reverse Osmosis" (RO) filtration refers to a high-pressure membrane filtration process (300 to 850 psi or 21 to 59 bar, but can be greater than 1000 psi) that retains almost all particles and ionic species and substances with molecular weight over 50 Dalton, while allowing water and some organic molecules to pass through. Reverse osmosis removes particles larger than 0.1 nm.

With regard to filter or membrane operation, "retentate" refers to that which is retained (or rejected) by the filter or porous membrane, and "permeate" refers to that which passes through the filter or porous membrane. Unless the context recommends an alternative meaning, the terms "concentrate", "concentrate stream", "reject stream" and "retentate stream" are synonymous with "retentate". Likewise, the terms "filtrate", "filtrate stream" and "permeate stream" are synonymous with "permeate".

Crude oil and natural gas production often involves use of large amounts of water. Stimulating the subterranean formation to enhance oil and gas production from the formation is often conducted using large amounts of steam or liquid water. Various types of wastewater may be treated to provide the source water for enhanced oil recovery. Produced water is one water source that may be employed. A method is provided for purifying produced water for various uses. In one embodiment, the produced water is freed from any associated gases with which it is produced from the formation. The produced water is then pretreated to remove oil and particulates. Clarified water that is produced by pretreatment is then purified in a membrane purification system to produce purified water. The purified water that is prepared using the present method may be used as base fluid for water, polymer or surfactant flooding, or as boiler feed water for steam generation. In one embodiment, the purified water meets the specifications for industrial uses; in one embodiment, for municipal and domestic uses.

A media filter is a type of filter that uses a bed of one or more of nutshell filter media, oyster shell filter media, sand, peat, shredded tires, foam, crushed glass, geo-textile fabric, crushed granite or other material to filter water as at least a part of the pretreatment process. An exemplary media filter includes size graded media within the filter, with water passing through the filter contacting media of decreasing size and/or increasing adsorption in passage through the filter. In one embodiment, produced water is pretreated for membrane filtration purification by passing through one or more multimedia filters selected from nutshell filters, ceramic ultrafiltration filters, polymeric ultrafiltration membranes and combinations. In one embodiment, pretreating comprises dual filtering involving a nutshell filter followed by a polymeric ultrafiltration filter.

In one embodiment, a method is provided for producing boiler feed water by pretreating produced water using a preliminary filtering to remove oil and particulates without a softening step. In one embodiment, pretreating the produced water includes one or both of a filtering step and a settling step, in any order, with no produced water softening involving warm lime softening, seeding softening or ion exchange softening.

In one embodiment, purified water produced as described herein contains less than 500 ppm TDS in one embodiment; less than 200 ppm TDS in a second embodiment; and less than 20 ppm in a third embodiment. The purified water contains less than 10 ppm hardness in one embodiment; less than 0.5 ppm hardness in a second embodiment; and less than 0.1 ppm hardness in a third embodiment; The purified water contains less than 20 ppm silica in one embodiment; less than 10 ppm silica in a second embodiment; less than 5 ppm silica in a third embodiment; and less than 1 ppm silica in a fourth embodiment.

A single pass RO system may be used to produce the purified water for steam-flooding or water-flooding. A two pass RO system may be used to produce the purified water for boiler feed water. Purified water that is produced as boiler feed water may contain no more than 0.004 ppm hardness, no more than 0.1 ppm silica and no more than 19 ppm TDS. When used for steam-flooding or water-flooding, the purified water may contain no more than 0.1 ppm hardness, no more than 5 ppm silica and no more than 200 ppm TDS.

In one embodiment, the method is useful for preparing purified water from any feed water source, including waste water from natural, industrial, municipal or domestic sources. While waste water from a variety of sources may be treated with the method, in one embodiment, the feed water to the pretreatment step comprises produced water from crude oil or natural gas extraction processes, e.g., formation water, aquifer, and injected water. The formation water may originate from a water saturated zone within the reservoir or zones above or below the pay zone. Many reservoirs are adjacent to an active aquifer and are subject to bottom or edge water drive. Water is often injected into oil reservoirs for pressure maintenance or secondary recovery purposes. The injected water is one of sources of produced water.

The produced water can contain contaminants in quantities ranging from insignificant to slurry. The term "contaminants" as used herein refers to oil, solid particulates and dissolved solids in produced water, e.g., sources of TDS, solids, sand and silt, carbonates, clays, proppant, corrosion products, and other suspended solids. Both inorganic and organic contaminants may occur in produced water. Dispersed oil consists of small droplets suspended in the aqueous phase. Factors that affect the concentration of dispersed oil in produced water include oil density, interfacial tension between oil and water phases, type and efficiency of chemical treatment, and type, size, and efficiency of the physical separation equipment. Examples of inorganic constituents that may occur in produced water are in Table I.

TABLE I

| Concentration Range Constituent | Units | Low | High | Median |
|---|---|---|---|---|
| TDS | mg/L | 100 | 400,000 | 50,000 |
| Sodium | mg/L | 0 | 150,000 | 9.400 |
| Chloride | mg/L | 0 | 250,000 | 29,000 |
| Barium | mg/L | 0 | 850 | N/A |
| Strontium | mg/L | 0 | 6,250 | N/A |
| Sulfate | mg/L | 0 | 15,000 | 500 |
| Bicarbonate | mg/L | 0 | 15,000 | 400 |
| Calcium | mg/L | 0 | 74,000 | 1,500 |

The contaminants may include inorganic contaminants, organic contaminants, or both. Organic contaminants may include hydrocarbons that occur naturally in produced water, e.g., organic acids, polycyclic aromatic hydrocarbons (PAHs), phenols, and volatiles. In one embodiment, the feed produced water comprises organic components that are very soluble in produced water, e.g., low molecular weight (C2-O5) carboxylic acids (fatty acids), ketones, and alcohols. They include acetic and propionic acid, acetone, and methanol. In some produced waters, the concentration of these components is greater than 5,000 ppm.

The produced water may contain scales, which form when ions in supersaturated produced water react to form precipitates when pressures and temperatures are decreased during production. Common scales include calcium carbonate, calcium sulfate, barium sulfate, strontium sulfate, and iron sulfate. In one embodiment, the produced water feed may comprise metals such as zinc, lead, manganese, iron, and barium. Metals concentrations in produced water are often higher than those in seawater.

Produced water may contain soluble inorganic salts, including, for example, one or more of calcium, magnesium, potassium, sodium, bicarbonates, chlorides, and sulfates.

Composition of the produced water that is the feed to the process may also be quantified by a determination of total dissolved solids (TDS) content. Exemplary inorganic salts in TDS include calcium, magnesium, potassium, sodium, bicarbonates, chlorides, and sulfates, as well as small amounts of organic matter dissolved in the produced water. In one embodiment, the produced water feed has a TDS content of greater than 5000 mg/L; in another embodiment, greater than 2000 mg/L; in another embodiment, greater than 1000 mg/L. The produced water contains in a range from 50 to 500 mg/L silica in one embodiment; in a range from 100 to 300 mg/L sodium in a second embodiment.

In the process, produced water is pretreated to remove particulates and oil. Pretreatment processes may include one or more of filtering, deoiling, flotation, coagulation and precipitation, and pH adjustment.

A media filter is a type of filter that uses a bed of one or more of nutshell filter media, oyster shell filter media, sand, peat, shredded tires, foam, crushed glass, geo-textile fabric, crushed granite or other material to filter water as at least a part of the pretreatment process. An exemplary media filter includes size graded media within the filter, with water passing through the filter contacting media of decreasing size and/or increasing adsorption in passage through the filter.

A pre-treatment filtering step may be employed to remove a large proportion of oil, particulates and other contaminants from the produced water, e.g., particulates that are more than 2 μm in size. Any filter media suitable for removal of the target contaminant or contaminants may be used so long as it is also suitable for use in a filter bed, e.g., nutshell filter media, such as media made from English walnut shells and black walnut shells. Nutshell filter media is known for its affinity for both water and oil, making it a desirable filter media that is typically used for the removal of oil from water and wastewater. Conventional nutshell filters include pressurized deep bed applications in which the water is forced through a bed depth. Periodic backwashes are also routinely conducted to regenerate the bed. Typical backwash methods include expanding or turning the bed by imparting energy to the bed.

In one embodiment, oyster shells are useful, either alone or in combination with nut shell filtering, for removing water soluble organic contaminants and BTEX (benzene, toluene, ethyl benzene and xylene) contaminants from the produced water. In one embodiment of a filter system with oyster shell material, the produced water feed stream is introduced at the top of a packed column containing the shell material, and the outlet stream is collected at the bottom of the column. In one embodiment with the use of oyster shell, $CaCO_3$ may be added to the produced water outlet as more than 90% of oyster shell component is $CaCO_3$. Additionally, the pH may be adjusted as the shells supply sufficient alkalinity to enhance the pH. Furthermore, the use of oyster shell removes phosphorous in the produced water by producing calcium phosphate precipitation.

In one embodiment with a produced water having a pH of greater than 9, the removal efficiency ranges from 70-90% for BTEX, phenol, and phosphorous for hydraulic retention time (HRT) of at least 2 hours. The removal efficiency is at least 85% for HRT of at least 4 hours.

Membrane purification of clarified water may be improved by further clarifying the produced water using ultrafiltration. For example, particulates present in the produced water, or particulates formed during one or more of softening, seeding, nutshell filtering and oyster shell filtering may be further removed by a preliminary ultrafiltration prior to membrane purification of the clarified water. An ultrafiltration step produces a clarified water containing particulates that are at most 10 μm in size in one embodiment; at most 5 μm in size in a second embodiment; and at most 2 μm in size in a third embodiment. Ultrafiltration may also remove at least a portion of oil (e.g. free oil) from the produced water; the clarified water after ultrafiltration contains at most 50 ppm oil in one embodiment; at most 20 ppm in a second embodiment; at most 5 ppm in a third embodiment; and at most 2 ppm in a fourth embodiment.

In one embodiment of the pre-treatment, conventional backwash steps including mechanical mixing and mechanical scrubbing with impellors and recycle lines, as well as high velocity gas or high velocity water in a countercurrent direction may be used for cleaning. Mechanical systems used to backwash beds increase the initial costs of the system and may lead to increased maintenance costs to service mechanical seals. Recirculation of the bed also increases the initial and maintenance costs of the filter unit and increases the footprint of the filter unit with additional pumps for recirculation. The mechanical backwash methods also utilize backwash fluid to remove any oil and suspended solids released from the bed, which leads to the generation of significant amounts of backwash fluid. Similarly, the use of high velocity backwash liquid generates a large volume of backwash fluid. Conventional backwash systems are also known to create dead spots in which the filter media is not sufficiently turned and/or in which the backwash fluid does not reach, effectively leaving oil and suspended solids in the bed.

In some embodiments, the produced water feed may be deoiled before pre-treatment. Deoiling processes are known. The deoiling process may comprise chemical and/or mechanical means, or combinations thereof. Suitable chemical processes include, for example, use of emulsion breakers, reverse breakers, sorbents, specialty chemicals or combinations thereof. Emulsion breakers are designed to remove oil from a water continuous phase, while reverse breakers are designed to remove oil from a water continuous matrix. The inclusion of sorbents is to remove both submicron oil and/or emulsified oils from the water. An alternate embodiment allows for the use specialty chemicals to enhance the oil/water separation. Such specialty chemicals may be added prior to or directly to a flotation step in the process. Mechanical means may involve membranes or other separation devices. In the case of membranes, ceramic or polymeric membranes may be used, and if the latter, the polymeric membranes may be microfilters, ultrafilters, nanofilters, or any combinations thereof. Mechanical means may also involve the use of centrifugal separators or cyclonic separators.

Produced water following the deoiling treatment contains at most 50 ppm oil (e.g. free oil) in one embodiment; at most 20 ppm in a second embodiment; at most 5 ppm in a third embodiment; and at most 2 ppm in a fourth embodiment. It is anticipated that a flotation unit can remove up to about 95% of oil and some of the gases, such as hydrogen sulfide and carbon dioxide, from water.

In one embodiment, the pretreatment process includes using a clarification module, optionally followed by flotation units and filters. The clarification module has sufficient capacity to provide the hydraulic retention time needed for separating oil and particulates from the water. In one embodiment, the clarification module has a hydraulic retention time, based on the volumetric flow rate of produced water to the module, of greater than 1 minute. In one embodiment, instead of or in addition to deoiling, a skimming process may be used to remove the oil layer from the water; clarified water is also produced, leaving a sludge material in the clarification module for separate removal. A subsequent filtering step through a bed of an adsorbent such as clay, diatomaceous earth, oyster shell, or a nutshell filter may be used to remove the last traces of oil in the produced water.

The settling step, optionally followed by filtering, produces clarified water having a turbidity of no more than 1.5 NTU unit in one embodiment; no more than 1.0 NTU unit in a second embodiment; no more than 0.5 NTU unit in a third embodiment; and no more than 0.2 NTU unit in a fourth embodiment.

In one embodiment, the pre-treatment process includes an optional floatation process for removing oil and particulates. Flotation methods for water treatment are known. In general, they involve incorporating an adequate amount of gas into the liquid stream as small bubbles in order to provide the required physical contact between the surface of the particles of foreign matter, e.g. oil droplets or suspended solid particles, and the surface of the gas bubbles. Flotation is thus influenced by the collision between bubbles and the particles of foreign matter, the formation of flocs of particles and the adsorption of bubbles onto the particles and the floc structures. The bubble/particle interactions are governed by the surface chemistry of the system and it will be appreciated that on contact these surfaces must adhere rather than be repulsed. Separation of the oil and particulates from the water generally occur in a vessel. A sufficiently large quiescent flotation region is provided in the vessel so that the particles/gas bubbles can rise to the surface of the liquid and be removed.

The above pretreatment steps are conducted at a temperature of at least 45° C. in one embodiment; in a range from 20° C. to 200° C. in one embodiment; from 100° C. to 200° C. in another embodiment; and from 120° C. to 200° C. in yet another embodiment.

Hardness values for the produced water relate to the concentration of multivalent cations, represented in parts per million (ppm). Typically, the multivalent cations are calcium, magnesium, strontium and barium. The total hardness is a summation of calcium, magnesium, strontium, and barium ions in terms of calcium carbonate equivalent values. The produced water may have a hardness of up to more than 1000 ppm in some embodiments, up to more than 5000 ppm in other embodiments. In one embodiment, the clarified water is provided to the membrane unit for purification without a softening pretreatment, the clarified water containing greater than 5000 ppm hardness in one embodiment; greater than 1000 ppm hardness in a second embodiment; greater than 100 ppm hardness in a third embodiment; and in a range from 100 to 10,000 ppm hardness in a fourth embodiment. In one embodiment, the clarified water that is provided to the membrane unit is partially softened, with up to 95% of the hardness being removed by pretreatment partial softening. Partially softened produced water contains less than 50 ppm hardness in one embodiment; less than 25 ppm in a second embodiment; and less than 15 ppm in a third embodiment. Fully softened produced water that may be used contains less than 1 ppm hardness in one embodiment; less than 0.1 ppm hardness in a second embodiment; and less than 0.01 ppm hardness in a third embodiment.

In one embodiment, the produced water may be partially softened in a partial softening unit prior to or in addition to pre-filtering. The unit may use chemical softening or an ion-exchange resin based softening unit. In one embodiment of the method, partially softening the produced water by chemical softening is not necessary in order to achieve target purity levels in the purified water produced in the process.

Softening processes using a chemical treatment for removing hardness from produced water are known. For example, partial softening could be achieved by the addition of sodium carbonate, sodium bi-carbonate, lime, magnesium salts, caustic, or combination of these salts. One example of a commercial chemical softening process is a hot or warm lime softening process. An exemplary warm lime process operates at near atmospheric pressure and a temperature between about 150° F. to about 200° F. (65.6° C. to 93.3° C.). in one embodiment, between about 150° F. to about 180° F. (65.6° C. to 82.2° C.). in a second embodiment. In the case of chemical softening, the chemicals cause a partial precipitation of the hardness materials from the water, which may then be followed by thickener unit and/or a clarification unit (as part of pre-filtering treatment) prior to entering the membrane modules. Thickening units are used for promoting precipitation of the solids. For handling the oily produced water, thickening units promote the separation of oil from water. These units may have means to promote thickening of the solids, while others use recirculation of solids to provide seeding to the incoming chemically treated fluids. A coagulation chemical may be added to promote the precipitations. Exemplary coagulants include ferric chloride, ferric sulfate, aluminum sulfate, polyaluminum chloride or other forms of iron or aluminum. A clarifier unit takes the upper layer of water (after solid separation) to be further clarified. Some clarifier units may be equipped with incline baffles near the top of the tank to coagulate and settle the residual solids.

In one embodiment prior to the membrane purification step, the pH of the produced water may be adjusted depending on the quality of the produced water feed and/or the type of membrane purification employed. The pH is adjusted to about 3 to 9 to reduce scaling in the membrane in one embodiment; from 3 to 7.9 in a second embodiment; and from 9 to 11.5 in a third embodiment. In yet another embodiment, the pH of the produced water is adjusted to cause seeding, i.e., precipitation of hardness materials, as well as oil, silt, solids and biospecies in the produced water.

Seeding involves supplying an additive to cause some of the ionic species in the produced water to form insoluble particulates. While settling, these insoluble particulates increase in size by adsorbing other insoluble and nearly insoluble ions as well as the other contaminants in the produced water, carrying all to the bottom of a clarification module and leaving behind purified produced water with reduced hardness. In one embodiment, an alkaline chemical is added to the produced water to initiate the seeding process. Illustrative, non-limiting alkaline chemicals include caustic or sodium hydroxide; soda ash or sodium carbonate in anhydrous or in one or more of the hydrated forms; lime or one or more of its constituents, including calcium oxide, calcium hydroxide and calcium carbonate in any of the various anhydrous or hydrated forms in which these materials occur; and magnesium oxide.

In one embodiment, sufficient alkaline chemical is added to the produced water to increase the pH of the water by at most 2 numbers; in another embodiment, by at most 1 number. In one embodiment, sufficient alkaline chemical is added to a produced water to yield produced water having an NTU value of greater than 2.5; in another embodiment in a range from 2.5 to 1000. The produced water in combination with the alkaline chemical is permitted to settle for a sufficient time to produce clarified water having an NTU value of no more than 1.5; in one embodiment, no more than 1.0; in one embodiment, no more than 0.2.

In one embodiment, partial softening is achieved through the use of an ion exchange water softener. Softeners include ion-exchange resins in which multivalent ions are exchanged for ions located on the resins, such as Na+. Water softeners include weak acid cation (WAC) and strong acid cation (SAC) softeners, either may be used. In one embodiment, no WAC softeners are used and approximately half the number of SAC softener units are used than what would be used for full softening of the water. In a second embodiment, no ion exchange is used in pretreating the produced water to make the clarified water.

An antiscalant may be added to the water prior to going through the membrane filtering system to prevent fouling of the membrane. Examples of antiscalants include HCl, sulfuric acid, or other types of acids, and/or conventional scale inhibitors.

Clarified water may be treated with an acid prior to the membrane to further reduce scaling tendencies of the clarified water. In one embodiment, an acid such as hydrochloric acid is used to reduce the pH of the clarified water. In one embodiment, the sufficient acid is added to the clarified water prior to the RO membrane treatment to a pH in a range from 5 to 7.9.

In an exemplary illustrated process, produced water having a pH in a range from 5 to 6.8 is treated with an alkaline chemical to increase the pH to a value in a range from 7.1 to 7.8, and the combination permitted to settle in a clarification module for a time to produce clarified water having a turbidity of no more than 0.5 NTU units. In one embodiment, at least the clarified water is passed through a filter to remove residual particulate matter. The clarified water following separation is acidified slightly to reduce the pH to a value within a range, for example, of from 5 to 6.8; the produced water is then treated using a membrane purification system.

In one embodiment, pretreated produced water is not pH-adjusted in preparation for RO membrane purification. In one embodiment, the clarified water that is the feed to the membrane purification system, having a pH in a range from 3 to 7.9, is passed through a filter medium selected from the group consisting of nutshell filters and polymeric ultrafiltration membranes. Clarified water that is recovered therefrom is passed, without additional softening or pH modification, to a membrane purification system, from which a purified water is recovered.

If present, particulates in the clarified water are at most 5 µm in size in one embodiment; and at most 2 µm in size in a second embodiment. The clarified water contains less than 50 ppm oil in one embodiment; less than 20 ppm oil in a second embodiment; less than 5 ppm oil in a third embodiment; and less than 2 ppm oil in a fourth embodiment. The clarified water has a turbidity of no more than 1.5 NTU unit in a first embodiment; no more than 1.0 NTU units in a second embodiment; no more than 0.5 NTU units in a third embodiment; and no more than 0.2 NTU units in a fourth embodiment. The clarified water feed to membrane purification has a pH in a range from 3 to 9 in one embodiment; from 3 to 7.9 in a second embodiment; and from 3 to 6 in a third embodiment. In one embodiment, the clarified water has a TDS content of greater than 5000 mg/L; in another embodiment, greater than 2000 mg/L; in another embodiment, greater than 1000 mg/L.

Membrane purification is a membrane-based separation process that processes the clarified water as feed to make the purified water product. Membrane purification removes particulates, hardness, TDS, and free and dissolved oil to the low levels required of the purified water.

A membrane purification system that is used in the method may include ultrafiltration membranes, reverse osmosis membranes, or a combination of the two, in any order. The membrane purification system may include one or more membrane modules, with each module including a plurality of membrane elements. In general, a membrane element is taken to represent one membrane. The number and type of membranes within a particular module may be the same or different. Likewise, the number and type of membranes within a membrane unit and within the membrane system may be the same or different. In one embodiment, the clarified water feed to membrane purification contains greater than 100,000 ppm TDS (e.g. in a range from 100,000 to 200,000 ppm TDS), and ultrafiltration membranes are employed in the membrane purification system. In a second embodiment, the clarified water feed contains less than 100,000 ppm TDS, and RO membranes are employed for purification.

The membrane purification system may include a plurality of membrane modules in series flow, with one stream from a module being passed in series flow to the next module in the series, and with a second stream from the module being recovered for further treatment, for disposal, or for other uses. In one embodiment, permeate is cascaded through the plurality of membrane modules in series flow, with the retentate from each module being recovered for disposal or further treatment. In a second embodiment, the retentate is cascaded through the plurality of membrane modules in series flow, and permeate is recovered from each module for further treatment or for use elsewhere. In a third embodiment, the system may include a plurality of membrane modules in parallel. Each train of modules in the parallel configuration may cascade a permeate stream or a retentate stream from one or more preceding modules in series flow.

In one embodiment, the membrane purification system is operated at conditions to remove both ammonia and boron from the clarified water. The embodiment includes the steps of passing the clarified water through a first membrane module comprising a plurality of membrane elements, wherein the clarified water contains at least ammonia and boron and has a pH in a range from 8 to 11.5; producing a first permeate stream and a first retentate stream from the first membrane module, wherein the boron remaining in the first permeate stream is less 25 mg/L; acid adjusting the first permeate stream to produce a second membrane module feed having a pH in a range from 3.5 to 7.9; passing the second membrane module feed to a second membrane module comprising a plurality of membrane elements; producing a second permeate stream and a second retentate stream from the second membrane module, wherein the ammonia remaining in the second permeate stream is less than 25 ppm, and recovering a purified water, having less than 1 ppm hardness from the membrane purification system.

In one embodiment, the pH in the first membrane module is in a range from 9 to 11.5. In one embodiment, the pH in the second membrane module is in a range from 5 to 7.9. The boron remaining in the first permeate stream is less than 5 mg/L in a second embodiment; less than 1 mg/L in a third embodiment; and less than 0.5 mg/L in a fourth embodiment. The ammonia remaining in the second permeate stream is less than 10 ppm in a second embodiment; and less than 5 ppm in a third embodiment.

In another embodiment, the order of boron and ammonia separation from the clarified water is reversed, with the ammonia being removed from the first permeate stream at a pH in a range from 3.5 to 7.9 in one embodiment; and from 5 to 7.9 in a second embodiment. Boron is removed from the second permeate stream at a pH in a range from 8 to 11.5 in one embodiment; and from 9 to 11.5 in a second embodiment.

In one embodiment, the method for purifying the clarified water from a pretreatment process includes managing the potential for scale formation and membrane degradation within the membrane purification system. In this embodiment, at least one membrane element is monitored for the development of increased turbidity or increased scaling within the membrane element or within the retentate stream that is passed to the membrane element from a preceding element. When an undesirable operation is detected within one or more membrane elements, the feed to the element is treated to reduce turbidity and scaling tendency of the feed. In one embodiment, at least a portion of the feed to the element is recycled to the feed to the membrane module of which the membrane element is a member. In one embodiment, at least a portion of the feed to the element is treated in-situ by one or more of filtering, pH adjustment, purified water addition to reduce the concentration of the sources of turbidity and scaling, addition of antiscalant, and partial softening. In one embodiment, at least a portion of the feed to the membrane element is removed to a separate clarification module for conducting the treatment. Again, one or more of filtering, pH adjustment, coagulation, seeding, purified water addition to reduce the concentration of the sources of turbidity and scaling, addition of antiscalant, and partial softening may be used. The clarified feed to the element is recycled to the module for further processing.

One embodiment of the method includes passing clarified water through at least one membrane module comprising a plurality of membrane elements in series flow, each succeeding membrane element after the first receiving a retentate fraction from the preceding membrane element as feed, wherein the concentration of contaminants in the retentate fraction increases as the fraction cascades to each of the plurality of membrane elements in series; selecting a membrane element in contact with the retentate fraction as feed that has a turbidity that exceeds 0.5 NTU units; treating at least a portion of the retentate feed fraction to the select membrane element and restoring the turbidity of the retentate feed fraction to no more than 0.5 NTU units.

In one embodiment, treatment includes removing at least a portion of the retentate fraction from the select membrane element; settling the removed retentate fraction in a clarification module and recovering clarified water having a turbidity of at most 0.5 NTU units and a solid waste; and returning the clarified water to the membrane module.

In one embodiment, treatment includes adding a coagulant to the retentate fraction in the clarification module. The coagulant may be selected, for example, from sodium hydroxide and potassium hydroxide. Alternatively, the coagulant may be selected, for example, from ferric chloride, ferric sulfate, aluminum sulfate, polyaluminum chloride or other forms of iron or aluminum.

In one embodiment, treatment includes filtering the clarified water from the clarification module and passing the filtered clarified water to the select membrane element. In one embodiment, treatment includes adding fresh or purified water to the clarification module.

The feed to the membrane element may be treated in-situ, including adding fresh or purified water to the retentate fraction in contact with the select membrane element; adjusting the pH of the retentate fraction in contact with the select membrane element; or by recycling at least a portion of the retentate fraction in contact with the select membrane element to the clarified water that is the feed to the at least one membrane module.

The purified water from the method contains less than 5 mg/L boron in one embodiment; less than 1 mg/L boron in a second embodiment; and less than 0.5 mg/L boron in a third embodiment. The purified water contains less than 25 mg/L ammonia in one embodiment; less than 10 mg/L ammonia in a second embodiment; and less than 5 mg/L ammonia in a third embodiment. The purified water contains less than 5 ppm hardness in a first embodiment; less than 1 ppm hardness in a second embodiment; less than 0.5 ppm hardness in a third embodiment; and less than 0.2 ppm hardness in a fourth embodiment. The purified water contains less than 100 ppm TDS in one embodiment; less than 10 ppm TDS in a second embodiment; and less than 1 ppm TDS in a third embodiment. The purified water has a pH in a range from 3 to 9 in one embodiment; from 3 to 7.9 in a second embodiment; and from 3 to 6 in a third embodiment. The purified water contains less than 10 ppm oil in one embodiment; less than 5 ppm oil in a second embodiment; and less than 2 ppm oil in a third embodiment. In a fourth embodiment, oil in the purified water is below the detection limit for free and dissolved oil. The purified water has a turbidity of no more than 1.5 NTU units in a first embodiment; no more than 1.0 NTU units in a second embodiment; no more than 0.5 NTU unites in a third embodiment; and no more than 0.2 NTU units in a fourth embodiment.

The purified water contains no particulates of size larger than 1 nm in one embodiment; and no particulates of size larger than 0.5 nm in a second embodiment; and no particulates of size larger than 0.1 nm in a third embodiment. The purified water contains less than 50 mg/L silica in one embodiment; less than 30 mg/L silica in a second embodiment; in a range from 0.05 to 50 mg/L silica in a third embodiment; and in a range from 1 to 30 mg/L silica in a fourth embodiment.

In one embodiment, the water treatment system is provided with a plurality of sensors to monitor the quality of the water in-between the process steps, e.g., the pretreated water stream, the water from the membrane filtering system, the reject stream, etc. The feedback from the sensor provides control parameters for one or more process steps to ensure the quality of the water feed and the purified water from the membrane system. Sensors include but are not limited to conductivity sensors, turbidity sensors, particulate sensors, and pH sensors.

Turbidity can be generally measured by using a turbidity meter, for example, a Hach Co. Model 2100 P Turbidimeter. A turbidity meter is a nephelometer that consists of a light source that illuminates a water/oil sample and a photoelectric cell that measures the intensity of light scattered at a 90° angle by the particles in the sample. A transmitted light detector also receives light that passes through the sample. The signal output (units in nephelometric turbidity units or NTUs) of the turbidimeter is a ratio of the two detectors. Meters can measure turbidity over a wide range from 0 to 1000 NTUs. The instrument must meet US-EPA design criteria as specified in US-EPA method 180.1.

In one embodiment, the method is useful for preparing an injection fluid for waterflood applications. Particulates in injection fluids are known to seriously impact the effectiveness of a particular injection fluid. Tight formations, in particular, may be plagued by slow water injection, or formation plugging due to injected oil, solids, silts, bacteria and other materials.

In one embodiment of the method, produced water is pretreated to remove oil, solids, and silts from produced water, and followed by using a membrane purification system or a nanofiltration (NF) membrane system to remove oil and solids from the water to very low levels. Since the RO or NF membranes will also remove the hardness materials (such as calcium, magnesium, strontium, and barium); and large molecules (such as sulfates, nitrates, carbonates, and some chlorides); this high quality treated water could be used in various applications, such as waterflood, enhanced recovery in steamflood, chemical flood (CEOR), or low salinity injection, etc. Since, in this embodiment, the RO or NF treated permeate water has no measurable oil, solids, and silts, it significantly improves the injectivities of purified water prepared in this way. Further, use of this purified water for waterflooding decreases the frequency of well workovers. Use of this purified water also enables more effective enhanced recovery (EOR) with steam and chemical flood (CEOR) into the tight formations. Due to the importance of injecting water to follow the conformance into the designated path, the reservoirs treated with the purified water do not require fracturing, but merely using the membrane process to enhance their performances.

The following Table II illustrates the results from an operation based on this embodiment.

TABLE II

| Specified Size of Particles to be Removed, μm | Maximum TSS in Effluent Water, mg/L | Half Life of the Injection Well, days | |
|---|---|---|---|
| 2.0 | <0.02 | 4485 | (12 years) |
| 5.0 | <0.73 | 563 | (1.5 years) |
| 10.0 | <4.81 | 100 | (3 months) |

In one embodiment of a waterflooding process for enhanced oil recovery (EOR), the purified water from the membrane filter has no measurable TSS (Total Suspended, non-Filterable Solids), and with the particle size of oil and solids of the molecular sizes, such as <<0.001 μm range, it is expected that the purified water may allow EOR operation with well life approaching infinity.

FIG. 1 illustrates a water purification system comprising a pretreatment step 20 followed by a two-stage membrane purification system 10. Produced water 18 is supplied to the pretreatment step 20 for conditioning prior to purification in a membrane purification system 10. Conditioning may include one or more particulate removal, softening to remove hardness in the produced water, and pH adjustment.

The clarified water recovered from pretreatment contains particulates that are at most 2 μm in size, and no more than 2 ppm total oil content, wherein the total oil includes free, soluble and emulsified oil. The clarified water 22 recovered from pretreatment is also pH-adjusted for a pH in a range from 3 to 7.9. These pretreatment processes are conducted to prepare clarified water 22, having a NTU value of no more than 1.0, for purification in the membrane purification system.

The embodiment of the membrane purification system 10 illustrated in FIG. 1 comprises one or more membrane units 40 and 70. Membrane unit 40 comprises membrane modules 42, 44 and 46, and membrane unit 70 comprises membrane module 72, with each module comprising one or more membrane elements. A membrane element is generally taken to represent one membrane; a plurality of membranes in close proximity, all in contact with the same feed, may in some situation be taken to represent a membrane element. The number and type of membranes within a particular module may be the same or different. Likewise, the number and type of membranes within a membrane unit and within the membrane system may be the same or different.

A unit may comprise one or more modules in series or parallel flow with respect to each other. When at least two modules (e.g., 42 and 46) are arranged in parallel flow, flow rate to each of the at least two modules may be the same or different. For modules arranged in series flow with respect to each other (e.g., 42 and 44), fluids are passed in series from the first module to the last. Within modules, membrane elements may be arranged in series or in parallel flow.

When the membrane purification system 10 comprises a plurality of membrane units, at least one retentate stream 60 from a preceding membrane unit 40 other than the last unit in the series is passed to a succeeding membrane unit 70 for further purification.

As shown in FIG. 1, clarified water 22 from the pretreatment step 18 is passed to the membrane purification system having two units in series flow of retentate with respect to each other. Prior to purification, clarified water 22 may be combined with one or more optional recycle streams in manifold 80, the blend being passed as stream 26 to unit 40. The membrane purification system purifies the produced water 22 and produces purified water 78 suitable for use in oil recovery as waterflood and chemical flood, as boiler feedwater for steam generation, for industrial uses and, in embodiments, for municipal and domestic uses. A waste stream 76 containing a substantial portion of the contaminants removed from the clarified water 22 is also produced. The membrane purification system includes a plurality of membrane elements that effectively recover a significant portion of the water in the produced water as purified, useable water. In one embodiment, the volumetric recovery ratio of purified water to waste stream from the membrane purification system is at least 3:1 (i.e. 3 volumes of purified water recovered for each volume of waste stream); in another embodiment, at least 4:1; in another embodiment, at least 9:1; in another embodiment, at least 19:1.

The membrane purification system 10 in this illustrative embodiment includes two units 40 and 70 in serial flow. Module 40 illustrates a two pass modular configuration, with permeate 66 from module 42 passing to module 44 for additional purification. The two pass configuration is in parallel flow with module 46, which passes a permeate stream 50 to be combined with permeate streams 48 and 74 to produce purified water 78. Retentate streams 56, 58 and 64 are combined as feed to module 72, from which is removed waste stream 76, which is the waste stream from the membrane purification system 10. On account of the decreasing amount of retentate with each membrane element in series, module 72 may include fewer membrane elements than upstream module 46. As shown in FIG. 1, each succeeding unit treats the retentate generated from the RO separation in the preceding unit, with the result that the volumetric flow of retentate to each unit after the first unit is less than the flow to a succeeding unit. Thus, in the embodiment illustrated in FIG. 1, the 1st membrane unit includes three modules, and the 2nd unit includes a single module. Each of the modules may be the same or different; modules (e.g. 42 and 46) in parallel flow may treat the same or different amounts fluid; they may have the same number and type of RO membranes, or different types and numbers of membranes.

In the embodiment of the method illustrated in FIG. 1, the clarified water that is used as feed to the membrane purification system has been pretreated to the extent to mitigate scaling or precipitation of organic and inorganic materials on the first RO element that the clarified water contacts. It is not necessary to formulate the clarified water to ensure that no scaling occurs on any membrane within the membrane purification system. Accordingly, the clarified water is maintained to contain particulates that are at most 2 μm in size, and to contain no more than 2 ppm total oil content. In addition, the pH of the clarified water is maintained in a range from 6-8, and the NTU value of the water is maintained to be no more than 1.0, prior to purifying the water in the RO system. It is not necessary to condition the produced water to a pH of greater than 9.5 for example, as in the conventional process, such that scaling does not occur through the membrane purification system.

Figure 2:
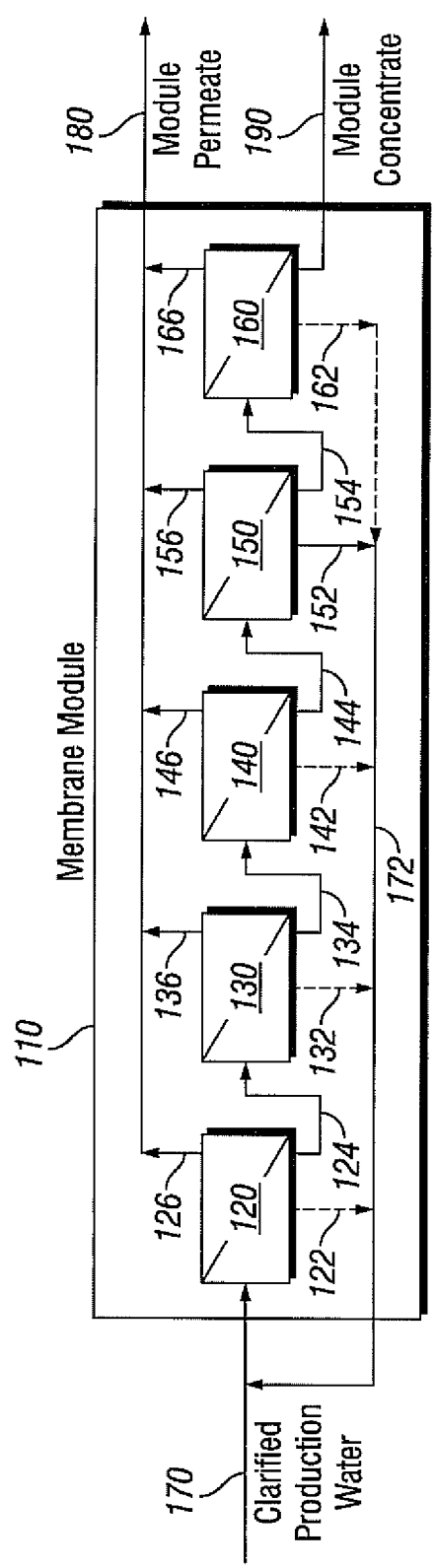
FIGS. 2-4 illustrate mechanisms and methods for mitigating membrane scaling at an individual membrane element level within a membrane module.

Details of an embodiment of the purification method in membrane module 110, having five elements, are illustrated in FIG. 2. RO membrane module 110 comprises a plurality of RO membrane elements 120, 130, 140, 150 and 160 in series flow. The feed 170 to the module 110 passes to a 1st element 120, comprising one or more RO membranes. Retentate (124, 134, 144, 154, and 190) from each element is passed in turn to a succeeding element (130, 140, 150, and 160) in series flow, each element removing additional amounts of purified permeate water (126, 136, 146, 156, and 166) from the retentate. Each succeeding RO membrane element after the first receives a contaminant-enriched stream (e.g., 124, 134, 144 and 154) from the preceding RO membrane element as feed, wherein the concentration of contaminants in the contaminant-enriched stream increases as the stream cascades past each of the plurality of RO membrane elements 120, 130, 140, 150 and 160 in series flow. Retentate stream 190 is passed from the module for recovery as purified water or as feed to further downstream processing.

As a result, the contaminant concentration of the retentate stream increases as it passes through the module, and the solubility characteristics of the retentate solution are changed, leading to an increased probability that one or more components of the retentate will precipitate, increasing turbidity and possibly forming scale on the membrane in one of the elements in serial flow through the module. In one embodiment, a high turbidity is due to silica present in the retentate, since silica deposition and scaling is a particular problem for membrane purification systems. In an illustrative example, the contaminant composition in the retentate in contact with a select element (e.g., element 150 in FIG. 2) exceeds the solubility concentration for at least one compound in the retentate, and an analysis shows that the retentate 154 has a turbidity of greater than 0.2 NTU units, indicating the increased probability of scaling occurring on the membrane on the select (i.e. 150) and/or a succeeding (i.e. 160) element. Retentate having a turbidity of greater than 1.5 NTU units in one embodiment; greater than 1.0 NTU units in another embodiment; and greater than 0.2 NTU units in another embodiment triggers a mitigation step to reduce the turbidity. The present process provides a method for treating the retentate within at least one of the membrane elements to mitigate scaling, deposition and/or precipitation on subsequent membrane elements in the series flow. Thus, the turbidity target is achieved by treating at least a portion of the contaminant-enriched stream that is in contact with the select membrane element and restoring the turbidity of the contaminant-enriched stream in contact with the selected membrane element to no more than 0.5 NTU units.

In the example illustrated in FIG. 2, scaling on element 150 (and potentially element 160 and subsequent) membranes is mitigated by recycling at least a portion of the retentate 152 recovered from element 150 to the feed 170 through stream 172. Active recycle of retentate 152 is indicated by the solid arrow in FIG. 2. Dotted arrows 122, 132, 142, and 162 are indicative of recycle lines that are not activated in this example. Any or all of these recycle lines may be activated as necessary to mitigate an increase in turbidity of the retentate in one or more of the other membrane elements. Blending the relatively concentrated solution 152 with the relatively more dilute clarified water 170 reduces the probability of scaling and deposition, and permits increased removal of contaminants from the system. The relative amount of recycle retentate is small compared to the amount of clarified water that is fed to the membrane system. In one embodiment, the volumetric flow rate of clarified water to recycle retentate is greater than 3:1; in another embodiment, greater than 5:1; in another embodiment, greater than 10:1; in another embodiment in a range from 10:1 to 10,000:1.

A sufficient amount of retentate 150 is recycled through stream 152 to improve the clarity of 154 in contact with membrane element 150. Depending on the amount of flow and the size and number of membrane elements, the clarity of stream 154 will improve as a result of the 152 recycle, to reach a target turbidity of no more than 1.5 NTU unit in one embodiment; no more than 1.0 NTU unit in a second embodiment; no more than 0.5 NTU unit in a third embodiment; and no more than 0.2 NTU unit in a fourth embodiment.

At the target turbidity, recycle 152 may be ceased, continued, or continued at a reduced rate. Under some conditions, restoring the clarity of retentate 154 to a target value may have the effect of decreasing the clarity of retentate 190, which is the reject stream from the module 110, and recycle of the element 160 retentate through stream 162 is commenced. In one embodiment, more than one of recycle streams 122, 132, 142, 152 and 162 are activated through stream 172, for recycle to the feed 170.

The retentate 190 which is recovered from the last element in the series passes from the module. When the module is the last module in the series flow of retentate through the system, the retentate 190 may be recovered for disposal or for further treatment. When the module is followed by one or more modules in the series flow, the retentate 190 may be passed to succeeding modules in the system.

Permeate streams (126, 136, 146, 156 and 166) from each element are combined in a module permeate stream 180, for recovery as purified water or for further processing, using, for example, additional modules downstream from the module of FIG. 2. In the process, a substantial portion of the water in the clarified water is recovered from the system as purified water. In one embodiment, the volumetric flow ratio of the module permeate stream in FIG. 2 with the module retentate stream is greater than 3:1; and in one embodiment, in a range from 3:1 to 20:1.

Figure 3:
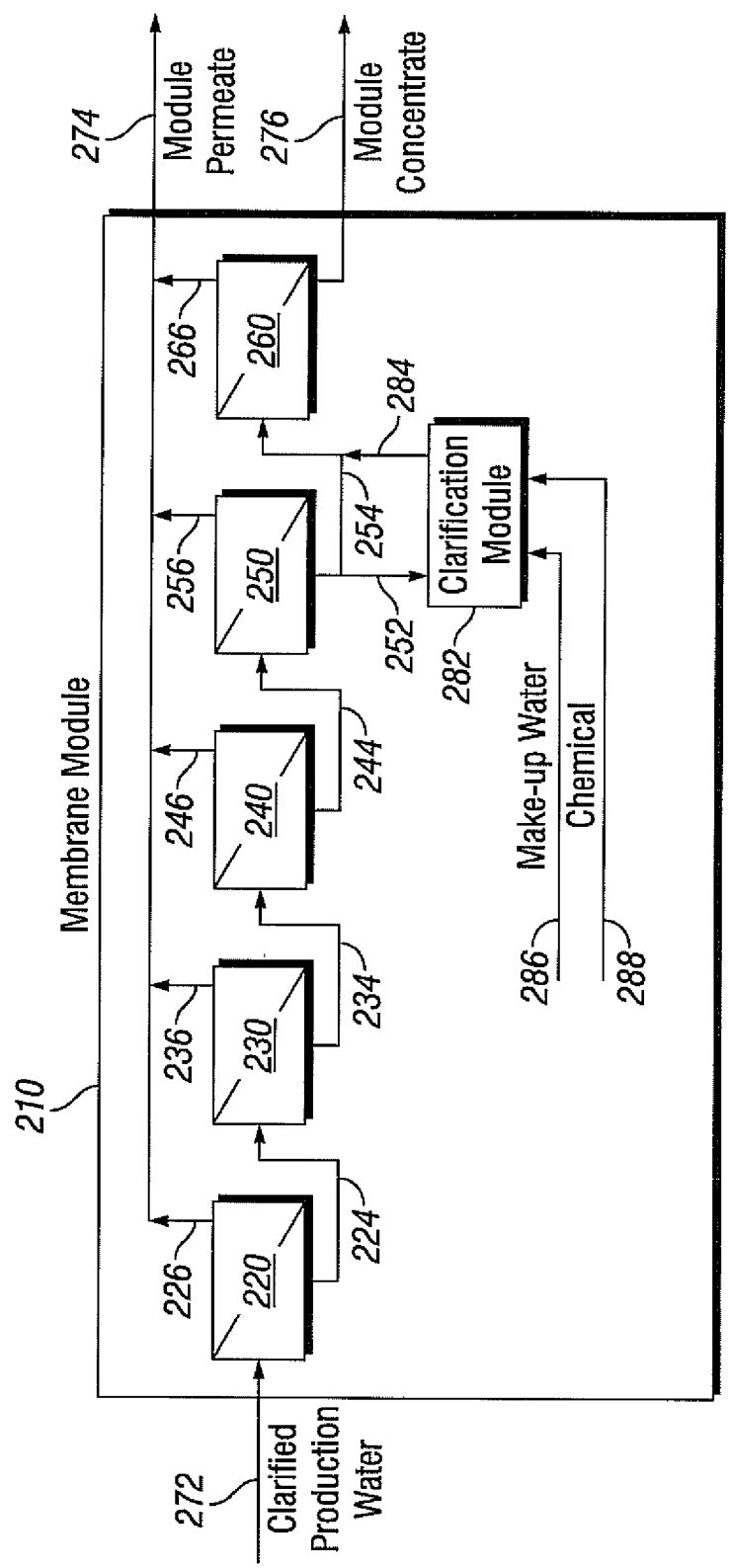

FIG. 3 illustrates, in another embodiment, a method for mitigating membrane scaling and fouling during operation of an exemplary module 210. In FIG. 3, feed stream 272 to membrane module 210 may be clarified water from pretreatment, optionally combined with one or more recycle streams, or may be passed to the module from a preceding module in series flow. Feedstream 272 is passed to membrane element 220; each succeeding membrane element 230, 240, 250 and 260 after element 220 receiving a retentate 224, 234, 244, and 254 from the preceding membrane element as feed, wherein the concentration of contaminants in the retentate increases as the stream cascades past each of the plurality of membrane elements in series flow. Permeate streams 226, 236, 246, 256 and 266 from membrane elements 220, 230, 240, 250 and 260 combine to form module permeate stream 274. In this illustrative embodiment, the contaminant composition in the retentate in contact with a select element (e.g. element 250 in FIG. 3) exceeds the solubility concentration for at least one compound in the retentate, and an analysis shows that the retentate has a turbidity of greater than 0.2 NTU units, indicating the increased probability of scaling occurring on membrane element 150 and/or a succeeding elements. In one embodiment, retentate having a turbidity of greater than 1.5 NTU units, and in another embodiment greater than 1.0 NTU units, and in another embodiment greater than 0.2 NTU units triggers a mitigation step to reduce the turbidity. In the FIG. 3 example, the turbidity target is achieved by treating at least a portion of the retentate stream 254 that is in contact with membrane element 250 and restoring its turbidity to no more than 0.2 NTU units.

Treating at least a portion of the contaminant-enriched stream that is in contact with membrane element 250 includes removing at least a portion of the retentate fraction from the select membrane element 250 through stream 252, clarifying the removed retentate fraction in a clarifying module 282 and recovering a clarified water 284 having a turbidity of no more than 1.5 NTU unit in one embodiment; no more than 1.0 NTU unit in a second embodiment; no more than 0.5 NTU unit in a third embodiment; and no more than 0.2 NTU unit in a fourth embodiment. Clarified water 284 is returned to the RO membrane module 210 for further processing. The illustration in FIG. 3 shows the clarified water recycle 284 being passed to retentate 254.

In one embodiment, clarification module 282 is a holding vessel, for causing the particulate matter in retentate 252 to settle, to produce a clarified recycle stream 284. In one embodiment, clarification module 282 comprises a filter medium for removing particulate matter from the retentate; the method includes filtering the clarified water from the clarification module 282 and passing the filtered clarified water 284 to the select membrane element 250.

Suitable filter media include absorption (e.g. a nutshell bed) ultrafiltration and nanofiltration. In one embodiment, fresh or purified water 286 is added to the retentate for improved clarity, to decrease the concentration of those materials in 252 that have exceeded the solubility limit. The purified water 286 may be recovered, at least in part, from the water purification method. In one embodiment, chemical 288 is added to adjust the pH of the retentate for improved clarity. Depending on the particular application, the chemical may be acid or alkaline. Illustrative, non-limiting alkaline chemicals include caustic or sodium hydroxide; soda ash or sodium carbonate in anhydrous or in one or more of the hydrated forms; lime or one or more of its constituents, including calcium oxide, calcium hydroxide and calcium carbonate in any of the various anhydrous or hydrated forms in which these materials occur; and magnesium oxide. In one embodiment, the alkaline chemical is a coagulant selected from sodium hydroxide, potassium hydroxide or combinations thereof. In one embodiment, the coagulant is selected from the group consisting of ferric chloride, ferric sulfate, aluminum sulfate, polyaluminum chloride or other forms of iron or aluminum. In one embodiment, the pH of contaminant-enriched stream 252 passed to the clarification module 282 has a pH in a range from 5 to 7.9. In one embodiment, the pH of the contaminant-enriched material in clarification module 282 is increased to a pH in a range from 8 to 11.5, and in another embodiment in a range from 9 to 11.5, and in another embodiment in a range from 3 to 7.9, to facilitate clarification of the retentate in clarification module 282. In one embodiment, a combination of these mitigation methods is applied.

In one or more embodiments, streams are added directly to the select membrane element for mitigating scaling within the module. In one embodiment, the step of treating at least a portion of the retentate fraction comprises adding fresh or purified water to the retentate fraction in contact with the select membrane element, thereby restoring the turbidity of the retentate fraction to no more than 0.2 NTU units (in one embodiment at most 1.0 NTU units; in one embodiment at most 1.5 NTU units). In one embodiment, the step of treating at least a portion of the contaminant-enriched stream comprises adjusting the pH of the retentate fraction in contact with the select membrane element by adding an alkaline chemical thereto, thereby restoring the turbidity of the contaminant-enriched stream to no more than 0.2 NTU units (in one embodiment at most 1.0 NTU units; in one embodiment at most 1.5 NTU units). In one embodiment, the pH of the contaminant-enriched stream is adjusted to a pH in a range from 9 to 11.5.

In one embodiment, the clarified recycle retentate 284 has a turbidity of no more than 1.5 NTU unit in one embodiment; no more than 1.0 NTU unit in a second embodiment; no more than 0.5 NTU unit in a third embodiment; and no more than 0.2 NTU unit in a fourth embodiment. In one embodiment, the clarified recycle retentate 284 has a pH of less than 6; in another embodiment in a range from 3 to 6.

Figure 4:
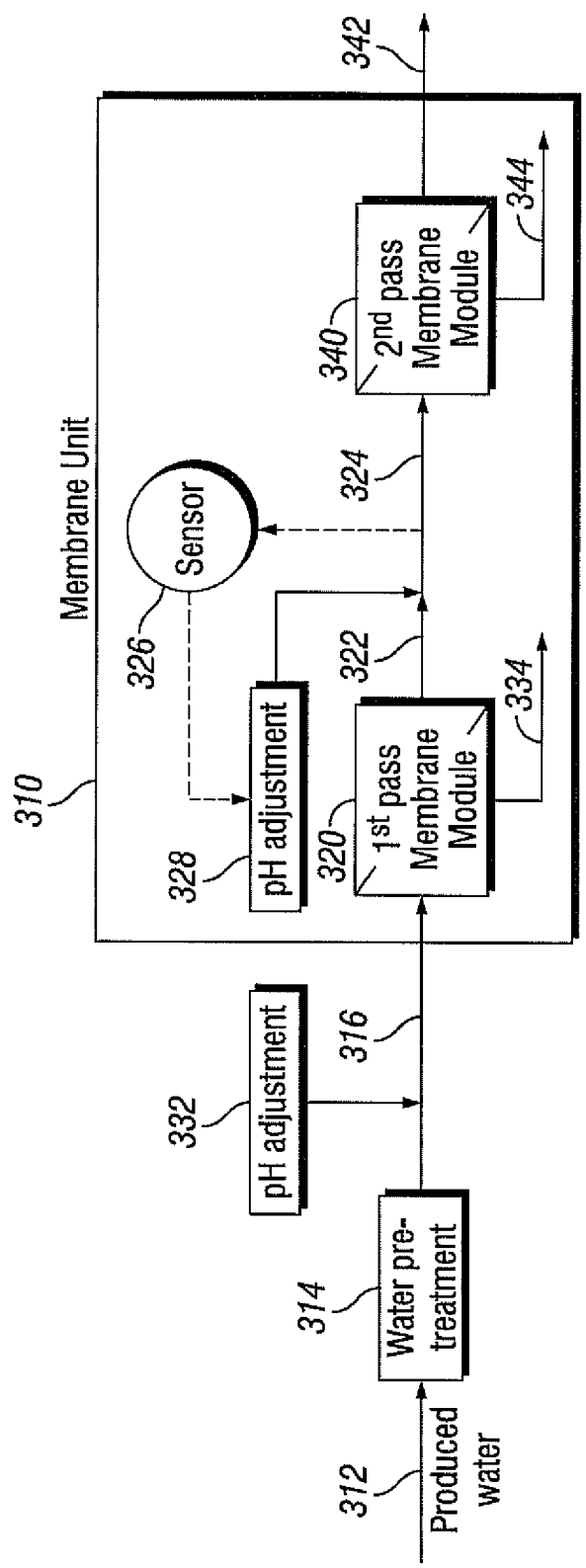

FIG. 4 illustrates an embodiment for separating boron and ammonia from clarified water. In conventional processes, two membrane passes are required to remove sufficient boron that the treated water can be discharged to the surface. Both passes are operated at high pH, around pH 10.5. Boron is rejected at this high pH, leaving clean treated water and a reject stream concentrated in boron. However, ammonia is not rejected at this high pH, meaning that it passes through the RO membranes and into the treated water.

Produced water 312 is pretreated in pretreatment step 314, and clarified water 316 is passed to membrane unit 310 for purification, the unit 310 comprising first pass RO module 320 comprising a plurality of membrane elements and second pass RO module 340 comprising a plurality of membrane elements. Feedstream 316 to the membrane unit 310 originates from a pretreating step 314; in one embodiment, feedstream 316 is passed to the unit 310 from an upstream membrane unit (not shown). In one embodiment, the pH of the feedstream 316 is adjusted 332 to precondition the feedstream for a particular membrane purification method. The feedstream 316 contains at least ammonia and boron and has a pH in a range from 8 to 11.5. In one embodiment, the clarified water contains greater than 10 mg/L ammonia; in another embodiment, greater than 25 mg/L ammonia. In one embodiment, the clarified water contains greater than 5 mg/L boron; in another embodiment, greater than 25 mg/L boron. Other contaminants may also be present, so long as the turbidity of the feed 316 is less than 1.5 NTU units; in one embodiment, no more than 1.0 NTU units; in another embodiment, no more than 0.5 NTU units; and in another embodiment, no more than 0.2 NTU units. First pass module 320 is operated for boron removal and second pass module 330 is operated for ammonia removal. Feed 316 to first pass module 320 has a pH in a range from 8 to 11.5, and in embodiments from 9 to 11.5. Partial purification of the clarified water 316 in first membrane module 320 produces a first permeate stream 322 and a first retentate stream 334. At the pH of the clarified water 316 as feed to the first membrane module 320, boron is effectively removed from the clarified water; in one embodiment, boron remaining in the first permeate stream 322 is less than 10% of the boron contained in the clarified water 316; in a second embodiment, less than 5% of the boron contained in the clarified water 316. In one embodiment, at least 50%, and in other embodiments at least 75% and at least 90% of the boron in feedstream 316 is excluded from first permeate 322 and removed in retentate 334. While some ammonia is removed in the first membrane module 320, to effectively remove much of the remaining ammonia, an acidifying chemical 328 is added to the first permeate stream 322 to increase the pH in feedstream 324 to the second membrane module 340. In one embodiment, sufficient acidifying chemical is added to increase the ammonia removal in a second RO membrane module 340. Suitable acidifying chemicals include HCl, sulfuric acid, or other types of organic and inorganic acids. In one embodiment, sufficient acidifying chemical 324 is added to reduce the ammonia remaining in a second permeate stream 322 to less than 10% of the ammonia in one embodiment; and less than 5% of the ammonia in a second embodiment, which is contained in the clarified water. In one embodiment, at least 50%, and in other embodiments at least 75% and at least 90% of the ammonia in feedstream 316 is excluded from second permeate 342 and removed in retentate 344. In one embodiment, sufficient acidifying chemical 328 is added to the first permeate stream 322 to produce a second membrane module feed 324 having a pH in a range from 3 to 7.9 in one embodiment, and 3 to 6 in another embodiment. Turbidity and/or pH of the feed 322 to the second membrane module may be monitored using sensor 326, and the amount of acidifying chemical 328 added to the stream adjusted to maintain the desired pH and/or turbidity. In one or more embodiments, the sensor 326 is selected from a conductivity sensor, a turbidity sensor, a particulate sensor, a pH meter and a combination.

Feedstream 324 is passed to second membrane module 340, producing a second permeate stream 342 and a second retentate stream 344 from the second membrane module, wherein the ammonia remaining in the second permeate stream is less than 10% of the ammonia contained in the clarified water. In one embodiment, the ammonia remaining in the second permeate stream 342 is less than 5% of the ammonia contained in the clarified water 316; in another embodiment, less than 3% of the ammonia contained in the clarified water 316.

In one embodiment, the pH balance in the embodiment illustrated in FIG. 4 may be reversed. In this embodiment, feedstream 316 is passed to the first membrane module 320 having a pH in a range from 3 to 7.9 in one embodiment and from 3 to 6 in another embodiment, for removing ammonia in the first membrane module 320. Alkaline chemical is supplied to the first permeate stream 322, resulting in a feedstream 324 to the second membrane module 340 having a pH in a range from 8 to 11.5 in one embodiment and 9 to 11.5 in a second embodiment, for effective boron removal from the second permeate 342 and into the second retentate stream 344.

Figure 5:
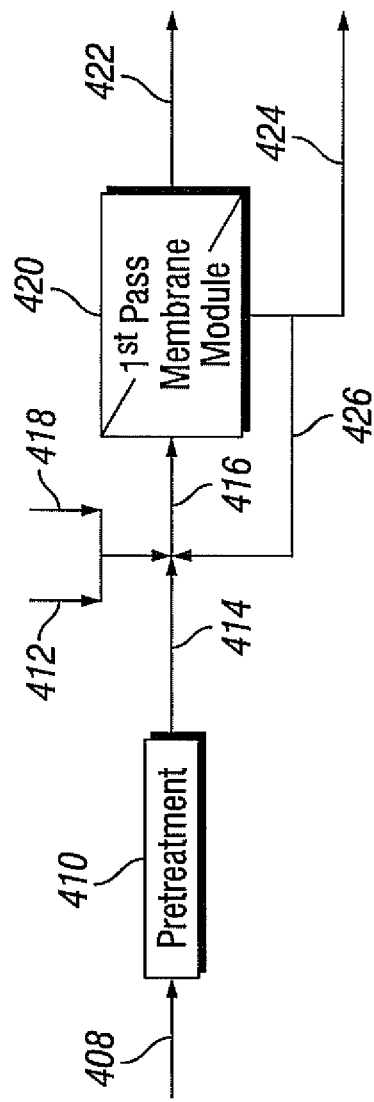
FIGS. 5 and 6 illustrate a single-pass (FIG. 5) and a two-pass (FIG. 6) RO membrane module for producing high purity permeate streams for use as purified water.

The embodiment illustrated in FIG. 5 includes pretreating produced water 408 in pretreating unit 410. Pretreating includes removing oil and silt from the produced water. In one embodiment, pretreating includes softening the produced water to reduce TDS and hardness. In one embodiment, softening the produced water is not required. The clarified water 414 is passed to membrane module 420. Clarified water 414 is optionally combined with recycle 426, and one or more scale inhibitors 418 to suppress scale formation on the downstream RO membrane and an acid/base titrant 412 to produce a combination stream 416 having a pH in a range from 3 to 7.9. The combination stream 416 passed to first pass RO membrane 420 for purifying the produced water, producing purified water 422. In one embodiment, the RO membrane 420 is operated at a pressure in a range from 250 to 1000 psig; in another embodiment in a range from 500 to 750 psig. In one embodiment, membrane unit 420 operates with no recycle 426. In another embodiment, unit 420 operates at a feed/recycle volumetric flow ratio in a range from 20:1 to 3:1; in another embodiment, from 10:1 to 5:1.

Rejection efficiencies of the system illustrated in FIG. 5 are high. Rejection of TDS is generally greater than 80%, and in one embodiment greater than 90%; in another embodiment, greater than 95%; and in another embodiment greater than 97%. Rejection of boron is generally greater than 50%; in one embodiment, greater than 60%; in another embodiment, greater than 70%. Rejection of ammonia is generally greater than 80%; in one embodiment, greater than 85%; in another embodiment, greater than 90%. Rejection of silica is generally greater than 85%; in one embodiment, greater than 90%; in another embodiment, greater than 95%; in another embodiment, greater than 97%. Recovery efficiencies as purified water 422 are generally greater than 70%; in one embodiment, greater than 75%; in another embodiment, greater than 80%.

Purified water 422 and reject stream 424 are recovered from the membrane unit. In one embodiment, purified water 422 has a TDS content of less than 250 ppm; in one embodiment, in a range from 25 to 250 ppm; in another embodiment, in a range from 25 to 200 ppm. In one embodiment, purified water 422 is utilized as boiler feedwater for steam generation. In one embodiment, the generated steam is utilized in enhanced oil recovery. Reject stream 424 is the retentate from RO membrane 420. In one embodiment, at least a portion of stream 424 is recycled to the clarified water feed to the RO membrane. In one embodiment, at least a portion of reject stream 424 is recovered from the RO membrane and processed further, or, in embodiments, disposed. As shown in Table III, purified water 422 from membrane unit 420 contains no more than 0.69 mg/L ammonia, no more than 12.1 mg/L boron, no more than 2.67 mg/L silica, with no more than 97.94 mg/L TDS and 0.00 mg/L hardness.

Table III lists exemplary operating parameters and properties of the various streams of FIG. 5. Purified water recovery in this particular example is 85.01%. While these values are derived from a particular simulation based on a commercial membrane, a particular feed and a particular set of operation parameters, ranges of values around each of the entries in the table are considered to be within the scope of the invention.

TABLE III

|  | Feed | Retentate | Permeate | |
| --- | --- | --- | --- | --- |
| Ref. # | 414 | 416 | 424 | 422 |
| Operating Parameters: | | | | |
| Flow rate, gal/min | 680 | 95.00 | 182.69 | 497.31 |
| Pressure, psig | 671.94 |  | 645.81 | 0.00 |
| TDS | 5216.22 |  |  | 97.94 |

| Flow properties, mg/L: Name | Feed | After Recycle | Stage 1 | Stage 1 | Total |
| --- | --- | --- | --- | --- | --- |
| NH4+ + NH3 | 18.58 | 33.85 | 125.70 | 0.69 | 0.69 |
| K | 42.00 | 74.99 | 278.07 | 0.38 | 0.38 |
| Na | 1500.00 | 2681.98 | 9960.02 | 8.36 | 8.31 |
| Mg | 20.00 | 35.81 | 133.19 | 0.04 | 0.04 |
| Ca | 47.00 | 84.16 | 313.01 | 0.09 | 0.09 |
| Sr | 1.50 | 2.69 | 9.99 | 0.00 | 0.00 |
| Ba | 0.25 | 0.45 | 1.66 | 0.00 | 0.00 |
| C03 | 6.75 | 23.81 | 227.90 | 0.00 | 0.00 |
| HC03 | 1000.00 | 1755.76 | 6248.27 | 6.50 | 6.50 |
| N03 | 0.50 | 0.88 | 3.18 | 0.03 | 0.03 |
| Cl | 1790.00 | 3451.23 | 12817.74 | 10.39 | 10.39 |
| F | 0.46 | 0.82 | 3.05 | 0.00 | 0.00 |
| S04 | 5.50 | 9.86 | 36.69 | 0.00 | 0.00 |
| Si02 | 300.00 | 535.66 | 1986.55 | 2.67 | 2.67 |
| Boron | 60.03 | 98.45 | 333.49 | 12.10 | 12.10 |
| C02 | 24.55 | 27.32 | 85.91 | 39.62 | 39.61 |
| TDS | 5075.73 | 9254.54 | 34050.51 | 97.94 | 91.94 |
| pH | 7.60 | 7.74 | 7.63 | 5.41 | 5.41 |

Figure 6:
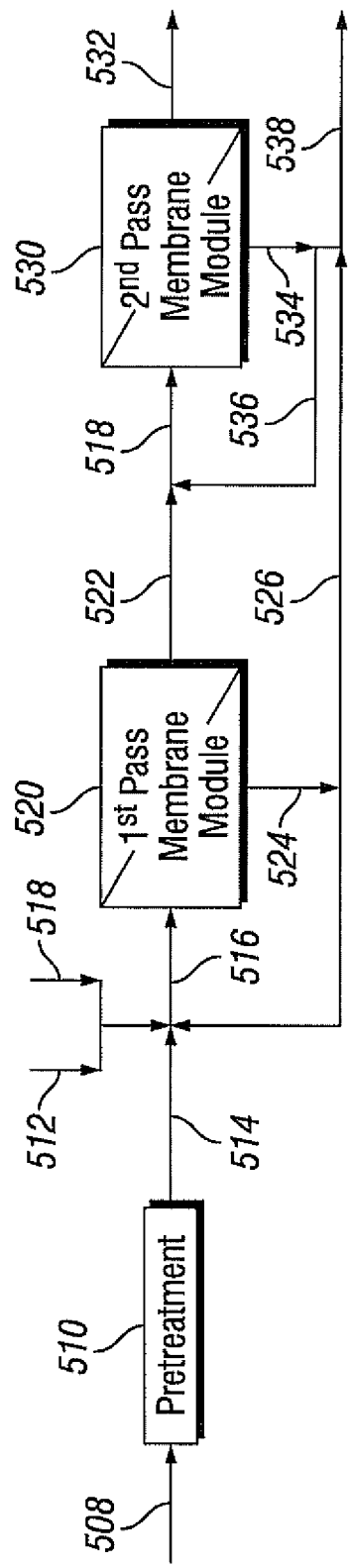

The embodiment illustrated in FIG. 6 includes pretreating produced water 508 in pretreating unit 510; clarified water 514 is passed to membrane unit 510 having dual-pass RO membrane modules 520 and 530 to produced purified water 532. Similar to the embodiment of FIG. 5, pretreating includes removing oil and silt from the produced water. In one embodiment, pretreating includes softening the produced water to remove TDS and hardness. In one embodiment, softening the produced water is not required. In one embodiment, the pretreated produced water 514 is acidity-adjusted using stream 512 to a pH in a range from 3 to 11.5 in one embodiment; in a pH range from 9 to 11.5 in a second embodiment; and in a pH range from 3 to 7.9 in a third embodiment. One or more scale inhibitors 518 may be further added to suppress scale formation on the downstream RO membrane. Clarified water 516 is passed to first pass RO membrane 520 for purifying the produced water, producing partially purified water as permeate 522. The purified water 522 is passed to a second pass RO membrane 530 for further purification. Purified water 532 produced in the membrane purification system is permeate from the second pass membrane unit 530. In one embodiment, RO membranes 520 and 530 are operated at a pressure in a range from 200 to 1000 psig; in another embodiment in a range from 250 to 750 psig. Retentate recycle 526 from membrane module 520 and retentate recycle 536 from membrane module 530 are also provided. Either or both recycle streams 526 and 536 may be activated during operation. In one embodiment, membrane module 520 operates with no recycle. In another embodiment, module 520 operates with recycle 526 at a feed/recycle volumetric flow ratio in a range from 20:1 to 3:1; in another embodiment, from 10:1 to 5:1. In one embodiment, membrane module 530 operates with no recycle. In another embodiment, module 530 operates with recycle 536 at a feed/recycle volumetric flow ratio in a range from 20:1 to 3:1; in another embodiment, from 10:1 to 5:1.

As with the example illustrated in FIG. 5, rejection efficiencies of the example of FIG. 6 are high. Rejection of TDS is generally greater than 80%, and in one embodiment greater than 90%; in another embodiment, greater than 95%; and in another embodiment greater than 97%. Rejection of boron is generally greater than 50%; in one embodiment, greater than 60%; in another embodiment, greater than 70%. Rejection of ammonia is generally greater than 80%; in one embodiment, greater than 85%; in another embodiment, greater than 90%. Rejection of silica is generally greater than 85%; in one embodiment, greater than 90%; in another embodiment, greater than 95%; in another embodiment, greater than 97%. Recovery efficiencies as purified water 422 are generally greater than 70%; in one embodiment, greater than 75%; in another embodiment, greater than 80%. As shown in Table IV, purified water 532 from membrane unit 510 contains no more than 0.79 mg/L ammonia, no more than 0.41 mg/L boron, no more than 0.06 mg/L silica, with no more than 4.21 mg/L TDS and 0.00 mg/L hardness.

Table IV lists exemplary operating parameters and properties of the various streams of FIG. 6. Recovery of purified water 532 from unit 510, based on this particular example, is 89.99%, based on feed 514. While these values are derived from a particular simulation based on a commercial membrane, a particular feed and a particular set of operation parameters, ranges of values around each of the entries in the table are considered to be within the scope of the invention.

may contain greater than 100,000 ppm TDS. In one embodiment, the feed stream of the produced water is not subjected to a flotation step or a filtration step prior to being passed through the ultrafiltration membrane module. A feed stream 708 of the high temperature produced water from a subterranean formation (not shown) is passed through an ultrafiltration membrane module 715 having a plurality of membrane elements.

The ultrafiltration (UF) membrane module 715 can include a plurality of ceramic UF filter elements, polymeric UF membrane elements and combinations thereof. The UF membranes 715 can be high temperature or standard temperature. The UF membrane 715 will achieve over 90% recovery using either high temperature polymeric or ceramic membranes. There is no need to use any additional filters. Hypochlorite, caustic and sulfuric acid will be used for back wash and cleaning in place (CIP) purposes. A first permeate stream 717 is formed containing up to 5000 ppm oil and gas, up to 20,000 ppm TDS and more than 0.5 mg/L boron. A first retentate stream 716 is also formed. In one embodiment, the first permeate stream 717 contains solid particles that are at most 1 µm in diameter and at most 1 ppm free oil. The first permeate stream 717 can have a pH in a range from about 3.0 to about 11.5 and a turbidity of no more than 0.5 NTU units.

The first permeate stream 717 is passed to an ion exchange softener module 718 having a plurality of ion exchange resin pellets therein to produce a soft water stream 721 having a hardness less than 5 ppm as calcium carbonate. The softener can be either SAC (Strong acid) or WAC (Weak acid) softener. The target hardness level can be <1 ppm to minimize calcite scaling in the reverse osmosis (RO) membranes 720 and 740 that follow. The pH of the soft water stream 721 can be adjusted to 9-12 and fed to a high temperature RO membrane module (i.e., 720 and 740) having a plurality of membrane elements to remove sodium

TABLE IV

| Operating Parameters | Feed Ref # 514 | Retentate 516 | Permeate 524 | 534 | 522 | 532 |
|---|---|---|---|---|---|---|
| Flow rate, Gal/min | 673 | 88.00 | 315.36 | 146.54 | 357.64 | 168.82 |
| Pressure, psig | 314.87 | | 281.92 | 250.02 | 0.00 | 0.00 |
| TDS, ppm | | | | | 3.07 | 6.62 |

| Flow properties, mg/L Name | Permeate After Feed | Retentate Recycle | Stage 1 | Stage Stage 2 {grave over ( )} | Stage 1 | 2 | Total |
|---|---|---|---|---|---|---|---|
| NH4+ + NH3 | 0.04 | 1.74 | 4.47 | 8.71 | 0.78 | 0.80 | 0.79 |
| K | 0.56 | 1.20 | 2.56 | 5.47 | 0.01 | 0.03 | 0.02 |
| Na | 12.15 | 99.24 | 211.16 | 452.92 | 0.54 | 1.31 | 0.79 |
| Mg | 0.06 | 0.13 | 0.28 | 0.60 | 0.00 | 0.00 | 0.00 |
| Ca | 0.13 | 0.2 | 0.60 | 1.30 | 0.01 | 0.00 | 0.00 |
| Sr | 0.00 | 0.0 | 0.00 | 0.00 | 0.00 | 0.00 | 0.00 |
| Sn | 0.00 | 0.0 | 0.00 | 0.00 | 0.00 | 0.00 | 0.00 |
| CO3 | 4.79 | 12.3 | 30.71 | 70.42 | 0.01 | 0.02 | 0.01 |
| HCO3 | 2.70 | 3.41 | 3.79 | 3.62 | 0.04 | 0.08 | 0.05 |
| NO3 | 0.04 | 0.0 | 0.18 | 0.37 | 0.00 | 0.01 | 0.00 |
| Cl | 15.26 | 33.06 | 70.42 | 151.21 | 0.12 | 0.30 | 0.18 |
| F | 0.00 | 0.00 | 0.00 | 0.00 | 0.00 | 0.00 | 0.00 |
| S04 | 0.00 | 0.00 | 0.00 | 0.00 | 0.00 | 0.00 | 0.00 |
| Si02 | 3.90 | 8.44 | 17.96 | 38.54 | 0.04 | 0.10 | 0.06 |
| Boron | 16.26 | 35.01 | 74.36 | 159.30 | 0.31 | 0.63 | 0.41 |
| C02 | 0.00 | 0.00 | 0.00 | 0.00 | 0.00 | 0.00 | 0.00 |
| TDS | 136.58 | 366.8 | 1776.89 | 1661.28 | 3.07 | 6.62 | 4.21 |
| pH | 10.50 | 10.74 | 11.00 | 11.28 | 9.52 | 9.84 | 9.65 |

Figure 7:
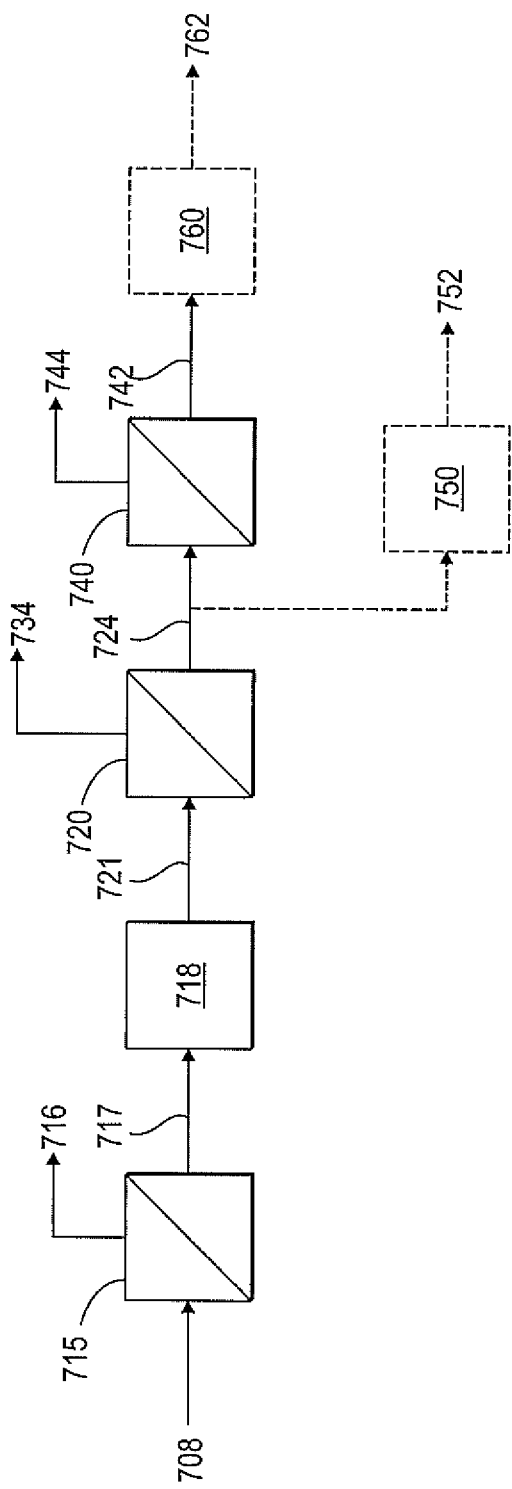
FIGS. 7-8 illustrate simplified mechanisms and methods for producing high purity permeate streams for use as purified water from high temperature produced water.

In one embodiment, referring to FIG. 7, high temperature produced water having a temperature of at least 45° C., even from 45° C. to 90° C., is treated, advantageously even without being subjected to a cooling step. The feed stream and boron to meet targets. The pH can be adjusted by supplying a sufficient amount of an alkaline chemical, selected from sodium hydroxide, soda ash, sodium carbonate, calcium oxide, calcium hydroxide, calcium carbonate, magnesium oxide and combinations thereof, to the soft water stream to increase its pH by from 0.1 to 5. In one embodiment, RO is operated at high temperature (>113° F.) and a two pass RO design may be needed to meet the boron specification. The operating temperature of the UF membranes 715 will need to match operating temperature of the RO membranes 720 and 740. In one embodiment, the $2^{nd}$ pass RO 740 can be replaced with boron selective resin if the sodium target is achieved.

An RO first pass permeate stream 724 containing less than 500 ppm TDS is formed as a purified water stream. An RO first retentate stream 734 is also produced. In one embodiment, the RO first pass permeate stream 724 is passed through an optional boron polishing step to form a stream 752 containing less than 2.0 ppm boron. The boron polishing step can utilize a plurality of boron ion exchange resin pellets in an optional ion exchange module 750 as needed.

In one embodiment, the RO first pass permeate stream 724 is passed to a second pass RO membrane 740 to form a RO second pass permeate stream 742 and a RO second retentate stream 744.

In one embodiment, the first permeate stream 724 contains more than 5 mg/L ammonia and the RO second pass permeate stream 742 is passed through an ammonia removal step to form a stream 762 containing less than 5 mg/L ammonia. In one embodiment, the ammonia removal step is conducted in a plurality of membrane contactors 760 as needed. Alternatively, the ammonia removal step is a plurality of ammonium ion exchange resin pellets in an ion exchange module (not shown).

In one embodiment, the feed stream of the produced water 708 contains at least 50 mg/L silica, and the process does not include a warm lime softening step to remove silica.

In one embodiment, the boron rejection can be at least 90% at a temperature of 60° C. and a pH of 10. The salt rejection can be at least 99% as NaCl at a temperature of 60° C. and a pH of 10. The purified water stream can contain no more than 0.004 ppm hardness as calcium carbonate and no more than 19 ppm TDS.

In one embodiment, the purified water stream (i.e., 742, 752 or 762) is directed to a beneficial reuse facility, which may include, but is not limited to, an aquifer recharge facility, an agriculture irrigation facility, a dust control facility, a washing facility, a cooling facility and a fire prevention facility.

Figure 8:
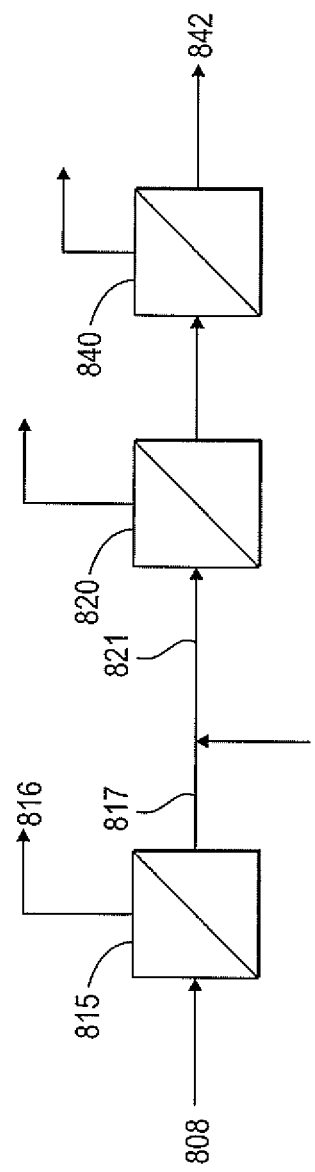

In another embodiment, referring to FIG. 8, high temperature produced water having a temperature of at least 45° C., even from 45° C. to 90° C., is treated, advantageously even without being subjected to a cooling step. The feed stream of the produced water 808 having a temperature of at least 45° C. has a hardness of from 1 to 10 ppm. The feed stream 808 may contain greater than 100,000 ppm TDS. Again, the feed stream is passed through an ultrafiltration membrane module 815 having a plurality of membrane elements to produce a first permeate stream 817 containing up to 5000 ppm oil and gas, up to 20,000 ppm TDS and more than 0.5 mg/L boron, and a first retentate stream 816. The pH of the first permeate stream 817 is adjusted to produce a reverse osmosis feed stream 821 having a pH of 9-12. The reverse osmosis feed stream 821 is passed to two high temperature reverse osmosis membrane modules 820 and 840 in series. A purified water stream 842 containing less than 500 ppm TDS is formed. Again, the boron rejection can be at least 90% at a temperature of 60° C. and a pH of 10. The salt rejection can be at least 99% as NaCl at a temperature of 60° C. and a pH of 10. The purified water stream 842 can contain no more than 0.004 ppm hardness as calcium carbonate and no more than 19 ppm TDS.

EXAMPLE 1

A packed column about 8 feet high and about 9.5 inches in diameter (ID) was packed with approximately 80 pounds of ¼ inch and finer size crushed oyster shells. An aqueous solution containing organic contaminants, including BTEX compounds (benzene, toluene, ethyl-benzene and the xylenes) and soluble organics (soluble oil), was introduced at the top of the column at a flow rate between 0.4 and 2.0 gpm. The average flow rate was maintained at approximately 1.0 gpm. Water was collected at the bottom of the column and analyzed using gas chromatography.

The concentrations of the soluble organic and BTEX compounds in the inlet and outlet streams of the column are given in Table V. The detectable limit for the BTEX compounds was 0.1 µg/L. The total hydrocarbon was obtained using the purge and trap method. All dispersed oil was removed from the feed solution before entering the packed column, and the total hydrocarbon was therefore essentially soluble organics (or soluble oil).

TABLE V

| Run # | Flow rate (GPM) | Component | Inlet Conc. (µg/L) | Outlet Conc. (µg/L) | % Removal |
|---|---|---|---|---|---|
| 1 | 1.0 | benzene | ND* | ND | 98.7 |
|   |   | toluene | ND | ND |   |
|   |   | ethyl-benzene | ND | ND |   |
|   |   | xylene | 0.3 | ND |   |
|   |   | total HC | 78.2 | 1.0 |   |
| 2 | 1.0 | Benzene | ND | ND | 99.9 |
|   |   | toluene | ND | ND |   |
|   |   | ethyl-benzene | ND | ND |   |
|   |   | xylene | 0.3 | ND |   |
|   |   | total HC | 108.7 | 0.1 |   |
| 3 | 1.0 | Benzene | ND | ND | 98.1 |
|   |   | toluene | 0.2 | ND |   |
|   |   | ethyl-benzene | ND | ND |   |
|   |   | xylene | 4.5 | ND |   |
|   |   | total HC | 94.6 | 1.8 |   |
| 4 | 1.0 | Benzene | ND | ND | 96.7 |
|   |   | toluene | 0.3 | ND |   |
|   |   | ethyl-benzene | ND | ND |   |
|   |   | xylene | 4.0 | ND |   |
|   |   | total HC | 117.9 | 3.9 |   |
| 5 | 1.0 | Benzene | ND | ND | 97.5 |
|   |   | toluene | 0.4 | ND |   |
|   |   | ethyl-benzene | ND | ND |   |
|   |   | xylene | 11.9 | ND |   |
|   |   | total HC | 132.5 | 3.3 |   |
| 6 | 1.0 | Benzene | ND | ND | 96.7 |
|   |   | toluene | 0.4 | ND |   |
|   |   | ethyl-benzene | ND | ND |   |
|   |   | xylene | 6.0 | ND |   |
|   |   | total HC | 140.3 | 4.6 |   |
| 7 | 0.4 | Benzene | ND | ND | 98.0 |
|   |   | toluene | 1.2 | ND |   |
|   |   | ethyl-benzene | 0.6 | ND |   |
|   |   | xylene | 10.8 | ND |   |
|   |   | total HC | 93.4 | 1.9 |   |
| 8 | 0.4 | Benzene | ND | ND | 98.4 |
|   |   | toluene | 1.6 | ND |   |
|   |   | ethyl-benzene | 1.2 | ND |   |
|   |   | xylene | 9.5 | ND |   |
|   |   | total HC | 120.3 | 1.9 |   |

*Not detectable.

EXAMPLE 2

Produced water is treated to remove gas, oil, and larger particles. The produced water is then partially softened, after which antiscalant is added to the partially softened water, and the partially softened water is then run through a reverse osmosis system. The reverse osmosis system may include one or more reverse osmosis modules. In an embodiment of the invention, two RO modules are used. In the case of using more than one RO modules, the reject water from the second RO modules may be recycled back into the influx of the first RO module. In another embodiment, the RO module includes reverse osmosis/nanofiltrate (RO/NF) membranes.

In this example, produced water from one type of reservoir consists of approximately 3,800 ppm of total hardness. Partial water softening followed by one or more RO membranes yields purified water having a hardness of less than 1.0 ppm, to meet steamflooding requirements. Embodiments of the disclosure use The RO membranes may be high recovery RO membranes.

EXAMPLE 3

Produced water is treated to remove gas, oil, and larger particles. This process can include a clarification module followed by flotation units and filters. It is anticipated that a flotation unit can remove up to about 95% of oil and some of the gases, such as hydrogen sulfide and carbon dioxide, from water. An ultra-filtration unit, such as a ceramic UF membrane unit may also be used prior to the softening and RO system of the current disclosure. The water may also be heated or cooled prior to entering the softening system (chemical or softener based), or after going through the softening system and before entering the RO system. For example, the water may be cooled to lower than 113° F. (45° C.) prior to going through the RO system but after going through the softening system. As another example, the water may be heated prior to chemical softening methods. After pretreatment, the produced water is then partially softened in a partial softening unit. The unit may use chemical softening, or an ion-exchange resin based softening unit.

EXAMPLE 4

Simulation of partial water softening. A simulation of partial water softening was run using programs specifically designed by membrane companies for the specific membrane used. Water Analysis: Simulated produced water was used for the software programs for membrane calculations. Boiler Water Requirement: 207,000 BWPD for the treated produced water to meet the boiler water specifications. For the produced water, this would require approximately 300,000 BWPD for the RO membrane system, if the recovery factor is about 69-70%. Water Temperature: A temperature not exceeding 45° C. (113° F.) was used for this study. 113° F. is the maximum tolerance temperature for the RO membranes used in this example.

Table VI below contains the results of the first pass in a high-recovery low pressure RO membrane process simulation with RO recycling.

TABLE VI

| Pass Streams (mg/l as Ion) Name | Adjusted Feed After Feed | Concentrate Initial | Permeate Recycles | Stage 1 | Stage 1 | Total |
|---|---|---|---|---|---|---|
| $NH_4^+ + NH_3$ | 0.00 | 0.00 | 0.00 | 0.00 | 0.00 | 0.00 |
| K | 89.45 | 89.45 | 74.84 | 336.08 | 1.21 | 1.21 |
| Na | 1137.71 | 1137.71 | 950.71 | 4274.70 | 13.82 | 13.82 |
| Mg | 213.61 | 213.61 | 177.01 | 802.75 | 0.64 | 0.64 |
| Ca | 925.09 | 925.09 | 766.51 | 3476.50 | 2.69 | 2.69 |
| Sr | 35.12 | 35.12 | 29.10 | 131.98 | 0.10 | 0.10 |
| Ba | 0.00 | 0.00 | 0.00 | 0.00 | 0.00 | 0.00 |
| $CO_3$ | 8.54 | 8.54 | 5.39 | 144.89 | 0.00 | 0.00 |
| $HCO_3$ | 1072.63 | 1072.63 | 900.58 | 3801.04 | 14.30 | 14.30 |
| $NO_3$ | 0.00 | 0.00 | 0.00 | 0.00 | 0.00 | 0.00 |
| Cl | 2491.55 | 2556.10 | 2127.39 | 9604.91 | 19.81 | 19.81 |
| F | 0.00 | 0.00 | 0.00 | 0.00 | 0.00 | 0.00 |
| $SO_4$ | 1264.32 | 1264.32 | 1045.90 | 4751.45 | 1.47 | 1.47 |
| $SiO_2$ | 16.47 | 16.47 | 13.86 | 61.87 | 0.32 | 0.32 |
| Boron | 2.23 | 2.23 | 2.42 | 6.93 | 1.15 | 1.15 |
| $CO_2$ | 39.87 | 39.87 | 40.28 | 98.42 | 48.62 | 48.62 |
| TDS | 7267.23 | 7331.77 | 6105.13 | 27425.75 | 60.95 | 60.95 |
| pH | 7.28 | 7.28 | 7.22 | 7.25 | 5.59 | 5.59 |

Table VII below contains the results of the second pass in a high-recovery low pressure RO membrane process simulation with RO recycling. The results showed that with a two-pass RO membrane process, with recycling of the 2nd pass concentrate (reject) stream, recovery was 73% (Table VII). The quality of water was reached TDS of 4.85 ppm with only 0.01 ppm of calcium (no magnesium, strontium, barium), this calcium would be equivalent to 0.025 ppm of total hardness (Table VII).

TABLE VII

| Pass Streams (mg/l as Ion) Name | Concentrate Feed | Permeate Adjusted Feed | Stage 1 | Stage 1 | Total |
|---|---|---|---|---|---|
| $NH_4^+ + NH_3$ | 0.00 | 0.00 | 0.00 | 0.00 | 0.00 |
| K | 1.21 | 1.21 | 5.34 | 0.02 | 0.02 |
| Na | 13.82 | 13.82 | 60.79 | 0.17 | 0.17 |
| Mg | 0.64 | 0.64 | 2.82 | 0.00 | 0.00 |
| Ca | 2.69 | 2.69 | 11.90 | 0.01 | 0.01 |
| Sr | 0.10 | 0.10 | 0.45 | 0.00 | 0.00 |
| Ba | 0.00 | 0.00 | 0.00 | 0.00 | 0.00 |
| $CO_3$ | 0.00 | 0.00 | 0.01 | 0.00 | 0.00 |
| $HCO_3$ | 14.30 | 14.30 | 62.53 | 1.45 | 1.45 |
| $NO_3$ | 0.00 | 0.00 | 0.00 | 0.00 | 0.00 |
| Cl | 19.81 | 19.81 | 87.30 | 0.19 | 0.19 |
| F | 0.00 | 0.00 | 0.00 | 0.00 | 0.00 |
| $SO_4$ | 1.47 | 1.47 | 6.53 | 0.00 | 0.00 |
| $SiO_2$ | 0.32 | 0.32 | 1.41 | 0.01 | 0.01 |
| Boron | 1.15 | 1.15 | 3.30 | 0.52 | 0.52 |
| $CO_2$ | 48.62 | 48.62 | 48.71 | 47.75 | 47.74 |
| TDS | 60.95 | 60.95 | 257.98 | 4.85 | 4.85 |
| pH | 5.59 | 5.59 | 6.19 | 4.65 | 4.65 |

EXAMPLE 5

Chemical softening testing. Based on a field application, results show that with the chemical softening method the use of a thickener-clarifier operation with a sophisticated UF filtration system, such as ceramic membranes for removing oil and solids in feed water of RO membrane application may not be needed. Laboratory bottle and pilot tests were done to demonstrate the use of caustic, soda ash, or their combination, for partial softening of produced water. In this case, the turbidity of water could be reduced to 0.2 Nephelometric Turbidity Units (NTU), which is suitable for the RO membrane operation.

Testing was conducted using synthetic water with 3800 ppm of hardness and about 8000 ppm of TDS. The test procedure and results of each step are summarized as follows: With 100 ml of the synthetic water, 5 drops of crude oil was added. The sample was shaken 300 times in a prescription bottle. Measured turbidity was 5 NTU. Temperature was 93° C. in a water bath for 1 hour. 2200 ppm of sodium carbonate was added and mixed, giving a turbidity of 8 NTU. Total hardness was reduced from 3360 ppm to 1613 ppm with 52% reduction. After settling for 2 hours, the turbidity reduced from 8 to 0.21 NTU.

The results are summarized as follows. In this case, an evaporation test shows that in order to have 75% water recovery without scaling about 50% original hardness should be removed. Scale inhibitors are effective. Without the chemical scale tends to develop rapidly. Caustic and soda ash can reduce half of the original hardness. A lower amount of caustic than soda ash can reduce the same amount of hardness, and produces a less amount of precipitates respectively. For water containing oil particles, after treatment by either caustic or soda ash, the water quality is much better than controls (no soda ash or caustic). Further, soda ash treated water is better than caustic treated water; however, precipitates from adding soda ash tend to be denser and stick to the bottom of prescribed glass bottles. Higher temperature seems to help with clarifying oily water. As now with a temperature of 93° C. and a settling time of 3.5 hrs. The water turbidity treated by soda ash is 0.55 (initially 8). Extensive settling might not be necessary at 93° C. With initial turbidity 5.0, after two hours the turbidity is 0.21.

The above testing results show that the use of soda ash could reach a turbidity level of 0.2 NTU in 2 hours settling in a clarifier. This 0.2 NTU turbidity was established in testing for the treated water to be suitable for RO membrane operation.

The above testing results also show that partial softening is effective to reduce the total hardness to approximately 50% for a sample of produced water using scale inhibitors. Since the partial softening RO system increases the concentration of ions in the reject (concentrate) water, the concentration of hardness materials increases with the concentration increase. That is, when running a RO/NF membrane system at 50% recovery, the concentration of the ions will increase roughly by 50%. Hence, a way of handling this increase is decreasing the hardness by 50% prior to RO purification. When the hardness concentration decreases by 50%, then within the RO/NF system the ion concentration will increase about 50% when the system is run at 50% recovery. This technique effectively cancels the concentration effect of the increased hardness levels. It means that the concentration of hardness will keep the same as the feed water (before partial softening by 50%) throughout the RO/NF membrane system. Hence, this method minimizes the chemical treatment needed for scale control.

Additionally, the total softening process could also provide steam for the once through steam generator operations. The partial softening with RO membranes would also be able to supply feed water for boilers. The once through steam generation would provide up to 75-80% quality steam, and boiler would provide 97% or better quality steam for more effective steam flood.

EXAMPLE 6

Partial Water Softening with a High Temperature Membrane. A GE high temperature reverse osmosis membrane was used in this example. The membrane used was a high temperature reverse osmosis membrane that can operate at up to 70° C. Using GE's Winflows software, simulations were conducted for both two pass and three pass system layouts. Determination of the maximum overall recovery and the lowest TDS was conducted based on a trial-and-error manner. Any configuration that yields system error (except scale-indicating errors, scale prevention will be addressed by partial softening) was excluded from further consideration. Feed composition was modified to reflect 50% hardness removal for partial softening. In addition to eliminating systematic errors, caution was taken for limiting the maximum cross sectional flow rate to be lower than 20 GFD as suggested by the manufacturer.

In this example, 8750 gallons per minute of produced water using a two pass design with a total number of 5080 elements in total was simulated. The line from the second pass reject stream was recycled back into the first RO input stream. The three pass design had a total number of 6688 elements. The concentrate from the second pass was recycled back to the feed stream. The concentrate from the third pass combined with the concentrate from the first pass to form the total concentrate.

As shown in Table VIII below, the two pass design recovered 4.2% more water than the three pass design does, however, the TDS was compromised by 15.62 mg/L. Temperature was set to 137 F which was the projected feed temperature achieved by using fin-fan cooler.

TABLE VIII

| Temp (° F.) | Temp (° C.) | Permeate TDS (mg/L) at max recovery | Overall recovery (%) | Configuration |
|---|---|---|---|---|
| 137 | 58.3 | 19.68 | 67.2 | Two pass |
| 137 | 58.3 | 4.07 | 63 | Three pass |

In a high temperature environment, such as steam flood, a high temperature RO/NF (reverse osmosis or nanofiltration) membrane system is used to conserve energy, reduce hardness and TDS. The energy savings is significant in comparison with the use of traditional RO/NF membranes whereas the maximum tolerance temperature is 113 F, while high temperature membranes can have a tolerance temperature of 120-210 F (49-99° C.), for example. In some embodiments, a cooling system would not be need when using a high temperature membrane system. In some embodiments, the high RO membranes have recovery of up to 75% using partial softening to protect the fouling and scaling in the membrane elements. In some embodiments, with the high recovery and reduction of TDS and hardness, the high temperature membranes permeate water can reach boiler quality water level of <20 ppm TDS.

After running through the partial water softening system followed by the RO system, the water may then be supplied as feed water to a boiler or once-through steam generator (OTSG). For example, an OTSG could provide up to 75-80% quality steam, and a boiler could provide 97% or better quality steam for a more effective steam flood, given water that was processed through partial softening and RO.

The methods of the disclosure may be performed either on-shore or off-shore, and may be adjusted to make the most efficient use of the location. As an example, ion exchange water softening systems may be used off-shore in order to reduce the amount of chemicals and waste solids that need to be transported to and from the rig.

Embodiments of the disclosure include methods to reduce the hardness and TDS in produced water. One embodiment of the disclosure is a method of improving the percent recovery in water with high levels of hardness, the method comprising: a) receiving a produced water composition, b) partially softening the water composition, c) adding an antiscalant to the partially softened water composition, and c) directing the partially softened water composition through at least one reverse osmosis module. In embodiments of the disclosure, the effluent is directed from the reverse osmosis module to a boiler or a once-through steam generator. The produced water may be pretreated prior to being partially softened. For example, pretreatment may include filtering large particles out of the produced water, and removing gas and oil. The method may additionally include a decarbonator unit. The partially softened water may be cooled prior to directing the partially softened water composition through at least one reverse osmosis module or heated prior to partial water softening. In some embodiments, the water is cooled to less than 100° C., less than 95° C., less than 93° C., less than 90° C., or less than 80° C. In some embodiments, the RO membrane is a high temperature membrane. The high temperature membrane unit could be a reverse osmosis (RO) membrane unit, or a nanofiltration (NF) membrane unit. For example, the high temperature reverse osmosis module can have a maximum temperature of between 120 to 210° F. (i.e., 49-99° C.).

EXAMPLE 7

The configuration shown in FIG. 7 was used in this example.

Table IX below lists operating parameters and properties of the various streams. Purified water recovery in this particular example is 68.4%. The test was conducted in a lab using an in-house UF membrane skid 715, a 33,000-grain water softener 718 (available from Whirlpool Corporation, Benton Harbor, Mich.) and an in-house single RO element skid 720/740. The produced water samples tested were received directly from an oilfield. The UF skid was operated using high temperature polymeric UF membranes. The RO reject was recirculated to achieve the target recovery. The RO membrane used was a HYDRApro® 502 spiral wound membrane available from Hydranautics. The test was conducted at 55° C. (131° F.) and the pH was adjusted by 50% caustic solution to a pH of 11 in the $1^{st}$ pass RO (720) with no additional pH adjustment in the $2^{nd}$ pass (740). This pH is important to reject boron and control Si solubility. No precooling was used. No warm lime was used.

The data in Table IX below shows several things. For one, the boron, hardness, sodium and silica levels are all greatly reduced by the treatment process. The boron level achieved by the RO membrane module at high temperature after two passes is 0.04 mg/L, well below the target of 0.75 mg/L. The calcium and hardness level reductions achieved by the ion exchange unit 718 are significant (see Stream 721). The sodium level achieved by the ion exchange unit 718 and the RO membrane module 720/740 at high temperature after two passes is 96.3 mg/L, well below the target of 100 mg/L. Stream 742 had a Si level of 42.4 mg/L without the use of warm lime treatment and was very clear. Oil-in-water (OID) is completely eliminated by the treatment process.

TABLE IX

| | Stream 708 | Stream 717 | Stream 721 | Stream 724 | Stream 742 | Treatment target |
|---|---|---|---|---|---|---|
| Temperature (° F.) | 131 | 131 | 131 | 131 | 131 | None |
| Recovery factor | 100% | 100% | 95% | 80% | 100% | |
| Flow rate (bpd) | 100,000 | 100,000 | 95000 | 76000 | 76000 | |
| Boron (mg/L) | 61.2 | 61.2 | 61.2 | 1.018 | 0.04 | 0.75 |
| Calcium (mg/L) | 38 | 38 | 0.2 | 0.6 | 0.2 | None |
| Magnesium (mg/L) | 14 | 14 | 0 | 0 | 0 | None |
| Hardness (as $CaCO_3$ mg/L) | 153 | 153 | 0.5 | 1.5 | 0.5 | None |
| Sodium (mg/L) | 1590 | 1590 | 1740 | 484 | 96.3 | 100 |
| Potassium (mg/L) | 50 | 50 | 1.1 | 1.7 | 1 | None |
| Iron (mg/L) | 0.05 | 0.05 | 0.05 | 0.01 | 0.01 | None |
| Silica (as $SiO_2$ mg/L) | 249.4 | 249.4 | 245.1 | 74.9 | 42.4 | None |
| Sulfate (mg/L) | 249.0 | 249.0 | 249.0 | 6.0 | 3.0 | None |
| pH (mg/L) | 7.49 | 8.15 | 8.2 | 11 | 10.35 | None |
| TSS (mg/L) | 39 | 0.8 | 0.8 | 0 | 0 | None |
| OIW (Dispersed, mg/L) | 20.7 | 0.4 | 0.4 | 0 | 0 | ND |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention, inclusive of the stated value and has the meaning including the degree of error associated with measurement of the particular quantity.

While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the use of "may" or "may be" indicates that a modified term is appropriate, capable, or suitable for an indicated capacity, function, or usage, while taking into account that in some circumstances the modified term may sometimes not be appropriate, capable, or suitable.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated by reference.

The invention claimed is:

1. A method of treating high temperature produced water generated from production of oil and/or gas from a subterranean formation, comprising:
   passing a feed stream of the produced water having a temperature of at least 45° C. through an ultrafiltration membrane module comprising a plurality of membrane elements to produce a first permeate stream containing up to 5000 ppm total hydrocarbon, up to 20,000 ppm total dissolved solids and more than 0.5 mg/L boron and a first retentate stream;
   passing the first permeate stream to an ion exchange softener module comprising a plurality of softening ion exchange resin pellets to produce a soft water stream having a total hardness of less than 5 ppm as calcium carbonate;
   supplying an alkaline chemical to the soft water stream to increase a pH of the soft water stream to produce a reverse osmosis feed stream having a pH of 9-12; and
   passing the reverse osmosis feed stream to a high temperature reverse osmosis membrane module comprising a plurality of membrane elements to form a reverse osmosis first pass permeate stream containing less than 500 ppm total dissolved solids and less than 5.0 ppm boron and a reverse osmosis first retentate stream to produce a purified water stream;
   wherein the ultrafiltration membrane module, the ion exchange softener module, and the high temperature reverse osmosis membrane module each operate at a temperature of at least 45° C., and wherein the method does not include a step of cooling the produced water.

2. The method of claim 1 further comprising passing the reverse osmosis first pass permeate stream through a boron polishing step to form a stream containing less than 0.5 ppm boron.

3. The method of claim 2 wherein the boron polishing step comprises passing the reverse osmosis first pass permeate stream through a plurality of boron ion exchange resin pellets.

4. The method of claim 1 further comprising passing the reverse osmosis first pass permeate stream through a second reverse osmosis membrane module comprising a plurality of membrane elements to form a reverse osmosis second pass permeate stream to form a stream containing less than 0.5 ppm boron.

5. The method of claim 1 wherein the first permeate stream contains more than 5 mg/L ammonia, further comprising passing the reverse osmosis first pass permeate stream through an ammonia removal step to form a stream containing less than 5 mg/L ammonia.

6. The method of claim 5 wherein the ammonia removal step comprises passing the reverse osmosis first pass permeate stream through a plurality of membrane contactors to form a stream containing less than 5 mg/L ammonia.

7. The method of claim 5 wherein the ammonia removal step comprises passing the reverse osmosis first pass permeate stream through a plurality of ammonium ion exchange resin pellets.

8. The method of claim 1 further comprising recycling the reverse osmosis first pass permeate stream through the reverse osmosis membrane module to form a reverse osmosis second pass permeate stream and a reverse osmosis second retentate stream.

9. The method of claim 1 wherein the feed stream of the produced water has a temperature of from 45° C. to 90° C.

10. The method of claim 1 wherein the first permeate stream contains solid particulates that are at most 1 μm in diameter and at most 1 ppm free oil, and has a pH in a range from about 3.0 to about 11.5 and a turbidity of no more than 0.5 NTU units.

11. The method of claim 1 wherein the feed stream of the produced water contains at least 50 mg/L silica and is not subjected to a warm lime softening step to remove silica.

12. The method of claim 1 wherein the feed stream of the produced water is not subjected to a flotation step or an additional filtration step prior to passing the feed stream of the produced water through the ultrafiltration membrane module.

13. The method of claim 1 wherein the pH of the reverse osmosis feed stream is adjusted prior to the high temperature reverse osmosis membrane module by supplying a sufficient amount of an alkaline chemical, selected from sodium hydroxide, soda ash, sodium carbonate, potassium hydroxide and combinations thereof, to the reverse osmosis feed stream to increase its pH by from 0.1 to 5.

14. The method of claim 1 wherein the ultrafiltration membrane module comprises a plurality of polymeric ultrafiltration membrane elements or a plurality of ceramic ultrafiltration membrane elements.

15. The method of claim 1 further comprising directing the purified water stream to a beneficial reuse facility selected from an aquifer recharge facility, an agriculture irrigation facility, a dust control facility, a washing facility, a cooling facility and a fire prevention facility.

16. The method of claim 1 wherein the method has a boron rejection of at least 90% rejection at a temperature of 60° C. and a pH of 10.

17. The method of claim 1 wherein the method has a salt rejection of at least 99% as NaCl at a temperature of 60° C. and a pH of 10.

18. The method of claim 1 wherein the temperature of the feed stream of the produced water is less than or equal to 200° C.

19. The method of claim 1 wherein the feed stream of the produced water has a temperature of more than 45° C. and the temperature is less than or equal to 200° C.

* * * * *